(12) United States Patent
Lee et al.

(10) Patent No.: US 7,695,645 B2
(45) Date of Patent: Apr. 13, 2010

(54) CONDUCTIVE POLYMERS HAVING HIGHLY ENHANCED SOLUBILITY IN ORGANIC SOLVENT AND ELECTRICAL CONDUCTIVITY AND SYNTHESIZING PROCESS THEREOF

(76) Inventors: Suck-Hyun Lee, #19-9, Jungang-dong, Gwacheon-si, Gyeonggi-do (KR) 427-010; Chan-Woo Lee, Unam Apt. 202-1201, Maetan-dong, Yeongtong-gu, Suw, Gyeonggi-do (KR) 443-370

(*) Notice: Subject to any disclaimer, the term of this patent is extended or adjusted under 35 U.S.C. 154(b) by 0 days.

(21) Appl. No.: 12/056,157

(22) Filed: Mar. 26, 2008

(65) Prior Publication Data

US 2008/0308771 A1 Dec. 18, 2008

Related U.S. Application Data

(63) Continuation of application No. 11/120,082, filed on Apr. 28, 2005, now abandoned.

(30) Foreign Application Priority Data

| May 11, 2004 | (KR) | ............................. 2004-33168 |
| Apr. 19, 2005 | (KR) | ......................... 2005-0032461 |

(51) Int. Cl.
*H01B 1/00* (2006.01)
*B32B 27/00* (2006.01)
*B32B 27/40* (2006.01)
(52) U.S. Cl. .................. 252/500; 528/377; 528/423
(58) Field of Classification Search ............... 252/500; 528/377.423
See application file for complete search history.

(56) References Cited

U.S. PATENT DOCUMENTS

| 311,745 A | 2/1885 | Hallock |
| 4,904,553 A | 2/1990 | Nakajima et al. |
| 5,232,631 A | 8/1993 | Cao et al. |
| 5,276,112 A | 1/1994 | Macdiarmid et al. |
| 5,324,453 A | 6/1994 | Cao et al. |

(Continued)

FOREIGN PATENT DOCUMENTS

WO PCT/US97/13273 7/1997

(Continued)

OTHER PUBLICATIONS

European Search Report for EP 05 01 0076, 4 pages.

(Continued)

*Primary Examiner*—Mark Kopec
*Assistant Examiner*—Jaison P Thomas
(74) *Attorney, Agent, or Firm*—Baker & Daniels LLP

(57) ABSTRACT

The present invention relates to a new process of synthesizing conductive polymers from monomers substituted with amine group. The process provides simple synthesizing steps for the conductive polymers without using other additives such as stabilizers or emulsifiers. The conductive polymers synthesized according to the present invention have highly enhanced solubility in common organic solvents and electrical conductivity compared to conventional conductive polymers. Therefore, the conductive polymers synthesized according to the present process can be utilized in applications that require high electrical conductivity, for example an electro-magnetic interference shield or a transparent electrode of thin film, as well as in specific applications such as various conductive films, fibers, polymer blends, battery electrodes or conductive etch mask layers.

22 Claims, 13 Drawing Sheets

U.S. PATENT DOCUMENTS

| | | | |
|---|---|---|---|
| 5,519,111 | A | 5/1996 | Macdiarmid et al. |
| 5,567,356 | A | 10/1996 | Kinlen |
| 5,618,469 | A | 4/1997 | Harlev et al. |
| 5,837,806 | A | 11/1998 | Adams et al. |
| 6,030,551 | A | 2/2000 | Ho et al. |
| 6,072,027 | A | 6/2000 | Scortichini et al. |
| 6,265,532 | B1 | 7/2001 | Nicolau et al. |
| 6,586,565 | B2 | 7/2003 | Palaniappan |
| 6,630,567 | B1 | 10/2003 | Palaniappan |
| 2002/0062005 | A1 | 5/2002 | Palaniappan |

FOREIGN PATENT DOCUMENTS

| | | | |
|---|---|---|---|
| WO | WO 98/04611 | * | 2/1998 |
| WO | WO 02/074833 | | 9/2002 |

OTHER PUBLICATIONS

Cad Y et al. "Influence of Chemical Polymerization Conditions on the Properties of Poylanine" Polymer, Jordan Hill, Oxford, GB vol. 30, Dec. 1, 1989, pp. 2305-2311, ISSN: 0032-3861.

Kaplan S. et al. "Solid-State 13C NMR Characterization of Polyanilines", Journal of the American Chemical Society, American Chemical Society, Washington DC, vol. 110, No. 23, 1988, pp. 7647-7651, ISSN: 002-7863.

Kiebooms R. et al. "Synthesis, Electrical, and Optical properties of Conjugated Polymers", Handbook of Advanced Electronic and Photonic Materials and Devices, vol. 8, 2001, pp. 1-102.

Lee Kwanghee, et al. "Metallic Transport in Polyaniline", Nature, May 2006, vol. 441, 65-68 (May 4, 2006), New York, New York.

MacDiarmid, Alan, G. et al.; Oligomers and Isomers: New Horizons In Poly-Anilines, Elsevier, Synthetic Metals, vol. 100, Issue 1, Mar. 1999, pp. 131-140, Maryland Heights, Missouri.

Zimmermann, Angela et al., Initial States in the Electropolymerization of Aniline and p-Aminodiphenylamine as Studied by in situ FT-IR and UV-Vis Spectroelectrochemisry, Elsevier Science, Synthetic Metals, vol. 98, (1998) pp. 17-25, Maryland Heights, Missouri.

Raghunathan, Anasuya et al., "C CPMAS NMR, XRD, d.c. and a.c. electrical conductivity of aromatic acids doped polyaniline", Elsevier Science, Synthetic Metals, vol. 81, (1996) pp. 39-4725, Maryland Heights, Missouri.

Namgoong, Hyun et al. "Micro-Chemical Structure of Polyaniline Synthesized by Self-Stabilized Dispersion Polymerization", Macromolecular Research, vol. 15, No. 7 pp. 1-8, Beijing, P.R.China.

Lee, Suck-Hyun, High-Performance Polyaniline Prepared via Polymerization in a Self-Stabilized Dispersion, Advance Functional Materials, 2005, pp. 1495-1500, Wiley-VCH Verlag GmbH & Co. KGaA, Weinheim, Germany.

Cao, Yong, et al. "Influence of Chemical Polymerization Conditions on the Properties of Polyanilin", Polymer 1989, vol. 30, Dec. 1988, pp. 2305-2311, Beijing, China.

Geng, Yanhou, "Polymerization of Aniline in an Aqueous System Containing Organic Solvents", Elsevier, Synthetic Metals, vol. 96, Jan. 1998, pp. 1-6, Maryland Heights, Missouri.

Raghunathan, Anasuya; Rangarajan, G.; Trivedi, D.C., "C CPMAS NMR, XRD, d.c. and a.c. Electrical Conductivity of Aromatic Acids Doped Polyaniline," Synthetic Metals, vol. 81, 1996, pp. 39-47.

Laska, J., Girault, R., Quillard, S., Louarn, G., Pron, A., Lefrant, S., Raman Spectroscopic Studies of Polyaniline Protonation with bis (2-ethylhexyl) Hydrogen Phosphage, Synthetic Metals, vol. 75, 1995, pp. 69-74.

Cao, Yong; Andreatta, Alejandro; Heeger, Alan J.; Smith, Paul, "Influence of Chemical Polymerization Conditions on the Properties of Polyaniline," Polymer, vol. 30, Dec. 1989, pp. 2305.2311.

MacDiarmid, A.G.; Chiang, J.C.; Richter, A.F.; Somasiri, N.L.D., "Polyaniline: Synthesis and Characterization of the Emeraldine Oxidation State by Elemental Analysis," Conducting Polymers, 1987, pp. 105.120.

Percec, V.; Schlueter, D.; Ungar, G.; Cheng, S.Z.D.; Zhang, A., "Hierarchical Control of Internal Superstructure, Diameter, and Stability of Supramolecular and Macromolecular Columns Generated from Tapered Monodendritic Building Blocks," American Chemical Society, Macromolecules 1998, vol. 31, No. 6, pp. 1745-1762.

Geng, Yanhou; Li, Ji; Sun, Zaicheng; Jing, Xiabin; Wang, Fosong; "Polymerization of Aniline in an Aqueous System Containing Organic Solvents," Synthetic Metals, 1998, vol. 96, pp. 1-6.

Beadle, P.M.; Nicolau, Y.F.; Banka, E.; Rannou, P.; Djurado, D., "Controlled Polymerization of Aniline at Sub-zero Temperatures," Synthetic Metals, 1998, vol. 95, pp. 29-45.

Thyssen, A.; Hochfeld, A.; Kessel, R.; Meyer, A.; Schultze, J.W., "Anodic Polymerisation of Aniline and Methylsubstituted Derivatives: Ortho and Para Coupling," Synthetic Metals, vol. 29, 1989, pp. E357-E362.

Huang, Jiaxing; Virji, Shabnam; Weiller, Bruce H.; Kaner, Richard B., "Polyaniline Nanofibers: Facile Synthesis and Chemical Sensors," Journal of American Chemical Society, vol. 125, No. 2, 2003, pp. 314-315.

Min, Gary, "Inorganic Salts Effect on the Properties of Polyaniline,"Synthetic Metals, vol. 119, 2001, pp. 273-274.

Lee, J.Y.; Kim, D.Y.; Kim, C.Y., "Synthesis of Soluble Polypyrrole of the Doped State in Organic Solvents," Synthetic Metals, vol. 74, 1995, pp. 103-106.

Kohlman, R.S.; Zibold, Z.; Tanner, D.B.; Ihas, G.G.; Ishiguro, T.; Min, Y.G.; MacDiarmid, A.G.; Epstein, A.J., "Limits for Metallic Conductivity in Conducting Polymers," The American Physical Society, vol. 78, No. 20, May 19, 1997, pp. 3915-3918.

Huang, Jiaxing; Kaner, Richard B., "Nanofiber Formation in the Chemical Polymerization of Aniline: A Mechanistic Study," Angewandte Chemie International Edition, vol. 43, 2004, pp. 5817-5821.

Angelopoulos, M.; Dipietro, R.; Zheng, W.G.; MacDiarmid, A.G.; Epstein, A.J., "Effect of Selected Processing Parameters on Solution Properties and Morphology of Polyaniline and Impact on Conductivity," Synthetic Metals, vol. 84, 1997, pp. 35-39.

Yasuda, Ayumu; Shimidzu, Takeo, "Chemical and Electrochemical Analysis of Polyaniline Prepared with FeCl3," Synthetic Metals, vol. 61, 1993, pp. 239-245.

Furukawa, Y.; Ueda, F.; Hyodo, Y.; Harada, I.; Nakajima, T.; Kawagoe, T., "Vibrational Spectra and Structure of Polyaniline," American Chemical Society, Macromolecules 1998, vol. 21, pp. 1297-1305.

* cited by examiner

CONDUCTIVE POLYMERS HAVING HIGHLY ENHANCED SOLUBILITY IN ORGANIC SOLVENT AND ELECTRICAL CONDUCTIVITY AND SYNTHESIZING PROCESS THEREOF

CROSS-REFERENCE TO RELATED APPLICATIONS

This application is a continuation of U.S. patent application Ser. No. 11/120,082, filed Apr. 28, 2005, the disclosure of which is expressly incorporated herein by reference, which claims the benefits of Korean Patent Application No. 2004-33168, filed on May 11, 2004 in Korea and Korean Patent Application No. 2005-0032461, filed on Apr. 19, 2005, which are herein incorporated by reference for all purposes as if fully set forth herein.

BACKGROUND OF THE INVENTION

1. Field of the Invention

The present invention relates to conductive polymers, and more particularly to conductive polymers which have highly enhanced solubility in organic solvents and electrical conductivity, and synthesizing process thereof.

2. Discussion of the Related Art

Conductive polymers have conjugated structures along double bonds present in the backbone thereof and has much enhanced electrical conductive properties compared to other organic materials because the conductive polymers form partial electrical charges along the conjugate structures and thereby having unlocalized electrons when the polymers are doped with dopants such as a protonic acid. Because the conductive polymers have both enhanced electrical, magnetic or optical properties comparable with conventional metals and satisfactory mechanical properties and processability as conventional polymers, they have been remarkably attracted in the filed of chemistry, physics, material engineering and industries.

The first developed conductive polymer is polyacetylene, which was developed by Shirakawa et al., however, polyacetylene is oxidized easily in the air. After polyacetylene was developed, Conductive polymers such as polyaniline, polypyrrole, and polythiophene have been developed.

The conductive polymers can be used in various applications according to their electrical conductivity. For example, the conductive polymers with electrical conductivity of $10^{-13}$~$10^{-7}$ (S/cm), $10^{-6}$~$10^{-2}$ (S/cm), and equal to and more than $10^{0}$ (S/cm), respectively have been used as antistatic materials, static discharge materials, and electro-magnetic interference(EMI) shielding materials, battery electrodes, semiconductor and solar cells. Accordingly, the conductive polymers may be utilized in more various applications by improving their electrical conductivities.

Among intrinsically conducing polymers, polyaniline has been noticed in the relevant field since it is not only cheap and very stable compared to polypyrrole and polythiophene also doped easily by protonic acids.

The polyaniline (PANI) can be classified into the completely reduced from, leucoemeraldine, the intermediated oxidized form, emeraldine, and the fully oxidized form, pernigraniline, according to its oxidation state.

However, the conductive polymers synthesized through the conventional processes, especially the polyaniline as the completely reduced from, leucoemeraldine, the intermediated oxidized from, emeraldine salt, and the fully oxidized form, pernigraniline, have disadvantages that they cannot be made from melting process owing to their high boiling point and that they must experience complex processing steps since they have low solubility in solvents with high-boiling point or universal or compatible solvents such as meta-cresol.

In order to improve the problems of the conductive polymers as indicated above, copolymers such as aniline derivatives or graft copolymers have been synthesized by inducing various side chains into the benzene ring or amine group of the conductive polymers for improving solubility of the backbone of the conductive polymers. Alternatively, various dopants, or other organic materials, polymers or plasticizers are added into the conductive polymer for improving the processability and the electrical conductivity of the conductive polymers. However, those composites have lower electrical conductivity compared to the conductive polymers before reforming.

Polyaniline (PANI) can be synthesized either by electrochemical charge transfer reaction which uses electro-chemical reaction or by chemical oxidation process that uses protonation through acid-base or redox reaction. However, it has been known that the chemical oxidation process is suitable for producing polyaniline in industrial scales.

Representative chemical oxidation process for synthesizing polyaniline has been reported to MacDiarmid et al., who synthesized polyaniline by polymerizing aniline monomers dissolved in hydrochloric acid with oxidizing agents such as ammonium persulfate in aqueous solution in the temperature of 1~5° C., separating and washing the precipitates and then obtaining polyaniline (See A. G. MacDiarmid, J. C. Chiang, A. F. Richter, N. L. D. Somarisi, in L. Alcacer (ed.), Conducting Polymers, Special Applications, Reidel, Dordercht, 1987, p. 105). The MadDiarmid process have been utilized widely and regarded as a standard method for producing polyaniline.

The polyaniline of emeraldine base (EB) synthesized according to the MacDiarmid process has low molecular weight (intrinsic viscosity 0.8~1.2 dl/g), but it is dissolved in 1-methyl-2-pyrrolidon (NMP). Also it has reported that emeraldine salt produced by doping the EB with 10-camphorsulfonic acid (ES-CSA) is dissolved a little in meta-cresol. The film made from that solution containing ES-CSA has at most electrical conductivity of about 100 S/cm, on the other hand, the film made from emeraldine salt doped with hydrochloric acid (ES-HCl) shows highly lower electrical conductivity of about 5 S/cm. However, it needs to be separating not dissolving portion from the dissolved portion in the MacDiarmid process. Especially, the polyaniline synthesized according to the MacDiarmid process has low molecular weight, broad molecular weight distribution, and inferior solubility to solvents or electrical conductivity resulted from side chain reactions to the backbone. Therefore, there remains a need of improving the micro-chemical structure or electrical conductivity of polyaniline synthesized according to the MacDiarmid process.

In order to improve the disadvantages and inferior processability of the polyaniline synthesized by MacDiarmid process, a lot of researches which use emulsion polymerization have been suggested. For example, U.S. Pat. No. 5,232,631 and No. 5,324,453 to Cao et al., which are incorporated herein by reference, disclose process for synthesizing polyaniline by dissolving aniline monomers and functionalized protonic acid in polar solvents such as water, mixing the solution with an organic solvent to prepare an emulsion, and then adding an oxidizing agent into the emulsion. Cao et al. reported that the emeraldine salt (ES) can be dissolved in nonpolar solvent such as xylene because emulsifier acts as a dopant, and therefore, it is reacted with the polyaniline to form composite.

However, since Cao et al. uses functionalized protonic acids as emulsifier, it is difficult to control doping the emulsifier and the process requires commonly expensive material. Further, since the functionalized organic acid is hardly separated from polyaniline after polymerizing reaction, the conductive polymers may have only very limited uses and highly inferior electrical properties. For instance, the emeraldine salt, which synthesized according to Cao et al, doped with dodecyl benzene sulfonic acid (DBS) has a solubility of less than 0.5% and an electrical conductivity of only about 0.1 S/cm.

Kinlen of Monsanto produced polyaniline salt by preparing reverse emulsion system comprising an organic solvent such as 2-butoxyethanol soluble in water and an organic acid, which is not soluble in water but soluble in the organic solvent, as a hydrophobic emulsifier, mixing an aniline monomer and a radical initiator with the emulsion system and polymerizing the mixture to form polymer solution that has an organic layer, which contains polyaniline salt, separated from an aqueous layer containing the radical initiator and non-reacting compounds. (See U.S. Pat. No. 5,567,356; Kinlen, Macromolecules, 31, 1745 (1998), which are incorporated herein by reference). Kinlen reported that the polyaniline salt was soluble in nonpolar solvents of no less than 1% (w/w). However, it is difficult to synthesize polyaniline because the radical initiator in the aqueous layer is separated from the monomer in the organic layer and polyaniline synthesized according to Kinlen process has low electrical conductivity owing to difficulty of control doping process. For example, it was reported that polyaniline salt synthesized with dinonyl naphthalene sulfonic acid as a hydrophilic organic acid had an electrical conductivity of about $10^{-5}$ S/cm in case the salt is manufactured as pellets.

Harlev et al. synthesized polyaniline salt with the MacDiarmid process except using pyruvic acid instead of hydrochloric acid (See U.S. Pat. No. 5,618,469, which is incorporated herein by reference). It is possible to improve processability of polyaniline by using pyruvic acid because pyruvic acid functions as organic solvent as well as dopant. However, since pyruvic acid has lower acidity it is difficult to dope polyaniline by pyruvic acid. Accordingly, polyaniline doped with pyruvic acid has low electrical conductivity, and especially in case the polyaniline doped with pyruvic acid is used as a transparent electrode, it has very high apparent surface resistance as much as 20,000 $\Omega$/square, which is very high electrical resistance for the transparent electrode.

Ho et al., produced polyaniline through emulsion system prepared by adding specific emulsifier into an organic mixture solvent comprising an aniline monomer and a protonic acid with stirring (See U.S. Pat. No. 6,030,551, which is incorporated herein by reference). According to Ho et al., both a radical initiator such as benzoyl peroxide and the polyaniline is dissolved in the same non-aqueous layer, and therefore, it is possible to synthesize polyaniline solution in situ without residual solids. However, since it is not easy to separate the non-aqueous layer from an aqueous layer, it is expected that polyaniline synthesized according to Ho process may not have high electrical conductivity.

U.S. Pat. No. 6,072,027 to Carey et al., which is incorporated herein by reference, discloses a producing method of polyaniline with highly enhanced polymerization yield, by using chlorate salt or hydrochloric acid combined with bi- or trivalent iron salt as a new oxidization initiator.

Palaniappan et al. disclose a process for the preparation of polyaniline salt by forming inverted emulsion system that comprises an aqueous layer and an organic layer using a surfactant and then polymerizing the inverted emulsion system at room temperature using a radical initiator such as benzoyl peroxide dissolved in the organic layer (See U.S. Patent publication No. 2002-00062005, U.S. Pat. Nos. 6,586,565 and 6,630,567, which are incorporated herein by reference). However, polyaniline film prepared from Palaniappan process has very low electrical conductivity, for example about 0.1 S/cm, and may be only used in much limited applications since it is impossible to raise molecular weight of polyaniline.

In addition to emulsion polymerization as above, polyaniline synthesis processes through a dispersion polymerization, in which monomers such as aniline is fully dissolved in reacting solvent while synthesized polymers are not dissolved in the solvent, have been reported. For example, Armes et al. reported the polymerization process which comprises stabilizing sterically the conductive polymer by designing particular stabilizer and then particularizing the conductive polymer (See Armes et al., handbook of Conducting Polymers, Elsenbaumer ed. M. Dekker, New York, 1996, Vol. 1, p. 423). In this dispersion polymerization, since most of the stabilizer covers with the polyaniline, the polyaniline in aqueous solution can be prepared. However, the synthesized polyaniline has a particle size of about 60~300 nm, which is affected by the stabilizer, and has low electrical conductivity, which defines its application.

Further, there have been reported that polyaniline is synthesized in aqueous solution containing organic solvents. Geng et al. prepared polyaniline film, which has electrical conductivity of about 10 S/cm, through synthesizing polyaniline with organic solvents such as ethanol, THF, and acetone (See Geng et al., Synth. Metals. 96, 1 (1998)). However, since it needs very long polymerization reaction time in Geng process, a probability of side reaction is raised.

According to Beadel et al., the polyaniline produced by the standard synthesizing method disclosed in MacDiarmid as described above has higher electrical conductivity as it has higher molecular weight. Accordingly, the monomer needs to be reacted or polymerized at lower temperature in order to enhance molecular weight of the polymer (See Beadel et al., Synth. Met. 95, 29~45, 1998). For lowering reacting temperature, when aniline monomer is polymerized in homogeneous aqueous solution system, metallic salts such as LiCl, $CaF_2$ and the likes are usually added to the system in order to prevent the system from freezing. However, mixing those metallic salts with the solution system causes the reaction to being slow, that is to say, at least 48 hours to complete the polymerizing reaction, and therefore, it is difficult to control the polymerization reaction. Also, as lowering the reaction temperature, the synthesized polyaniline has an increased molecular weight as well as molecular weight distribution (polydispersity of equal to or more than 2.5).

Also, there form side chains as the aniline monomer is added into a quinonediimine group in intermediate chains. Accordingly, $FeCl_2$ as an oxidizing agent is added during polymerization reaction in order to inhibit formations of the side chains in polyaniline, or the polyaniline is eluted with organic solvents for removing side products such as oligomers which quit synthesis during the polymerization reaction. Besides, since the monomers are added into the polyaniline on the ortho-positions as much as the para-positions of the benzene ring in the polyaniline backbone in case of emulsion polymerization or interfacial polymerization, such synthesized polyaniline has much side chains, which cause the polyaniline to have lower electrical conductivity and solubility.

According to Thyssen et al., there is a probability of about 10% of the ortho coupling, which induces side chains in the backbone of the polymers, when the aniline monomers are polymerized by using electro-chemical process (See Thyssen et al., Synth. Met. 29, E357~E362, 1989). Such polymers synthesized by ortho-coupling has lower hydraulic dimensions, which results in decreased intrinsic viscosity, compared to polymers synthesized by para-coupling, i.e. polymers without side chains. In other words, the polymers synthesized by ortho-coupling has much side chains and has more molecular weights even though they have low intrinsic viscosity of equal to or less than 1.2 dl/g. Accordingly, the polymers synthesized by ortho-coupling has inferior processability without improving the electrical conductivity.

Moreover, Huang et al. produced polyaniline of nano-fiber form by preparing a system which comprises an organic layer and an aqueous layer immiscible with the organic layer, dissolving an aniline monomer in the organic layer, and an initiator and an organic acid in the aqueous layer, and polymerizing the monomer in the interface (See Huang et al., J. Am. Soc. 125, 314 (2003)).

Min of Dupont Technology reported that conductive polymer with high yield could be obtained by increasing level of LiCl or NaCl as additive in the MadDiarmid process, as described above, up to 5-10 M at 0° C. for 3 hours (See G. Min, Synth. Met., 119, 273, (2001)).

In addition to the patents and references described above, many researches were reported for improving physical or chemical properties, for example electrical conductivity of the conductive polymers (Organic Conductive molecules and Polymers, Vol. I-IV, Ed. By H. S, Nalwa, John Wiley & Sons, New York, 1997; Handbook of Conducting Polymers Vol. I, II, Ed. By Skotheim et al., Marcel Dekker, New York, 1998; Conductive Polymers, P. Chandrssekhar, Kluwer Acade. Pub. Boston, 1999; Conductive Electroactive Polymers by G. G. Wallace, G. M. Spinks, L. A. P. Kane-Maquire, P. T. Teasdale, $2^{nd}$ ed. CRC Press, New York, 2003).

However, the polyaniline producing processes disclosed to date make use of introducing substituents into monomers or mixing the monomers with immense amount of additives such as stabilizer or emulsifier, and therefore, it is difficult to obtain pure polyaniline. Also, because polyaniline according to conventional processes has synthesized by ortho-coupling as much as para-coupling and frequently forms side chains by side reactions, such polyaniline does not have high electrical conductivity, which limits its applications.

Also, polypyrrole has been synthesized mainly by electro-chemical synthetic process. In case of synthesizing polypyrrole by the electro-chemical process, unlike synthesizing polyaniline, acids are not added during polymerization, which makes the reaction simplify. However, when polypyrrole is synthesized according to the chemical process, side reactions such as inter-chain crosslink or side chain addition to the backbone of polypyrrole frequently happened, which causes synthesized polypyrrole to not dissolving in common solvents and therefore deteriorates processability. In case of synthesizing polypyrrole by electrical process, solvents or counter ions of conductive plate have highly affects on physical properties of polypyrrole.

Lee et al. prepared of conductive polypyrrole powder by reacting pyrrole monomers at 0° C. for 40 hours using chloroform and dodecyl benzene sulfonic acid (DBSA) of the same molar equivalents of chloroform (See J. Y. Lee, D. Y. Kim, C. Y. Kim, Synth. Met. 74, 103 (1995)). DBSA adopted by Lee et al. acts as both dopant and surfactant. However, polypyrrole film sample synthesized by Lee et al. has very low electrical conductivity of about 5 S/cm.

Besides, chemical process for synthesizing polypyrrole in organic solvents such as $CHCl_3$, THF, or $CH_3N_2O$ has been tried in order to produce polypyrrole being able to dissolve in the organic solvents. However, such synthesized polypyrrole did not have electrical conductivity at all.

Ames et al. reported a process for preparing stable colloidal polypyrrole by using poly-vinylalcohol, poly-ethyleneoxide, or poly-vinylpyridine as a steric stabilizer dissolved in water (See Armes et al., Handbook of Conducting Polymers Elsenbaumer ed. M. Dekker, New York, 1996, Vol. 1, p. 423). However, since polypyrrole powders are surrounded by a lot of stabilizers, like polyaniline, and therefore polypyrrole has a very low electrical conductivity.

Accordingly, it may enhance electrical conductivity of polypyrrole by linking pyrrole monomers on 2, 5 positions between pyrrole ring and sustaining linearity thereof. As mentioned above, pyrrole may be soluble in much solvents compared to aniline, however, it is very difficult to dissolve oxidizing agent and pyrrole monomer in the same solvent.

The synthetic conductive polymers, especially polyaniline has much lower real electrical conductivity than theoretically calculated electrical conductivity, about $10^5 \sim 10^6$ S/cm (Kohlamn et al., Phys. Rev. Lett. 78(20), 3915, 1997), because they does not have fully linear form and form completely orders such as crystalline structure per se. Since such polymers with lower electrical conductivity cannot be utilized as transparent plastic electrode or EMI shielding materials, there still remain needs of development of polyaniline having much improved electrical conductivity in the related field.

SUMMARY OF THE INVENTION

Accordingly, the present invention is directed to conductive polymers with much enhanced electrical conductivity and solubility to common solvents and process for producing the polymers that substantially obviates one or more of problems due to limitations and disadvantages of the related art.

The present invention is based on a new concept of self-stabilized dispersion polymerization (referred to as "SSDP"). The use of the term "self-stabilized" herein includes, but is not limited to, the dispersion in the absence of any stabilizers. For example, in contrast with conventional homogeneous or dispersion polymerization using an aqueous medium containing aniline, pyrrole, acid, and oxidant, this new polymerization process is performed in a heterogeneous biphasic system of organic and aqueous medium without any stabilizing additives. Here, the monomers and growing polymer chains act as a stabilizer, resulting in excellent dispersion of the organic phase inside of the aqueous reaction medium.

It is an objective of the present invention is to provide a synthesizing process of conductive polymers without using other additives such as emulsifier and antifreeze thereby reducing polymerization reaction time. Accordingly, the conductive polymers of the present invention have much highly improved physical property, for example electrical conductivity and solubility to common solvents.

It is another objective of the present invention is to provide a conductive polymer that has highly improved micro-chemical structure with little structural defects.

Additional features and advantages of the invention will be set forth herein which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, in one aspect, the present invention provide a process of synthesizing a conductive polymer, the process comprising: (a) mixing a monomer containing an amine group and an organic solvent with an acid solution; and (b) adding a radical initiator dissolved in a protonic acid into the acid solution to synthesize the conductive polymer.

Preferably, the monomer is mixed with the acid solution prior to the organic solvent.

Especially, the monomer with or without substituents has a structure represented by formula I below.

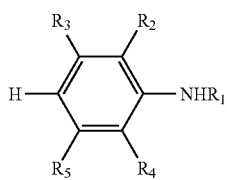

wherein $R_1$ is hydrogen, alkyl, or alkoxy group; and each $R_2$ to $R_5$ is respectively hydrogen, alkyl, alkenyl, cycloalkyl, cycloalkenyl, alkyl-thioalkyl, alkanoyl, thioalkyl, aryl-alkyl, alkyl-amino, amino, alkoxy carbonyl, alkyl sulfonyl, alkyl sulfinyl, thioaryl, sulfonyl, carboxyl, hydroxyl, halogen, nitro, or alkyl-aryl.

Also, the monomer with or without substituents has a structure represented by formula II below.

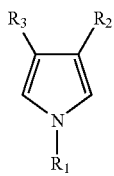

wherein $R_1$ is hydrogen, alkyl, or alkoxy group; and each $R_2$ and $R_3$ is respectively hydrogen, alkyl, alkenyl, cycloalkyl, cycloalkenyl, alkyl-thioalkyl, alkanoyl, thioalkyl, aryl-alkyl, alkyl-amino, amino, alkoxy carbonyl, alkyl sulfonyl, alkyl sulfinyl, thioaryl, sulfonyl, carboxyl, hydroxyl, halogen, nitro, or alkyl-aryl.

It is preferable that the acid used in step (a) of the present invention may comprise inorganic acid, and more preferably, the acid is selected from the group consisting of hydrochloric acid, sulfuric acid, nitric acid, or phosphoric acid.

Also, the protonic acid in step (b) of the present invention may be an inorganic acid such as hydrochloric acid, nitric acid, sulfuric acid, phosphoric acid, hydrofluoric acid, or hydroiodic acid. The protonic acid of the present invention comprises an organic acid, and preferably, the organic acid is selected from the group consisting of methyl sulfonic acid, dodecyl benzene sulfonic acid, antraquinone-2-sulfonic acid, 4-sulfosalicylic acid, camphor sulfonic acid, chlorinated sulfonic acid, trifluoro-sulfonic acid.

It is characterized that the organic solvent in step (a) has a solubility factor of about 17 to about 29. The organic solvent comprises hydrocarbons unsubstituted or substituted with hydroxyl, halogen, oxygen, ketone, or carboxyl group, such as an alkyl halide.

The hydrocarbons substituted with halogen may comprise dichloromethane, pentachloro ethane, 1,1,2,2-tetrachloro ethane, trichloro ethane, trichloro ethylene, dichloro methane, chloroform, ethyl bromide, ethyl chloride, dichloro propane, trichloro ethane, bis(2-chloroethyl)ether, dichloro ethyl ether, 1,2-dichloro benzene, or mixtures thereof.

The organic solvent substituted with hydroxyl group may be selected from the group consisting of comprise 1-propanol, 2-methyl-2-propanol, 1,2-dipropandiol, 1,3-propandiol, isopropyl alcohol, butanol, neopentanol, 2-methoxy ethanol, 2-butoxy ethanol, 2-ethyl-1-butanol, 3-methyl-1-butanol, 2-methyl-2-butanol, 3-methyl-2-butanol, 1-pentanol, 2-pentanol, 3-pentanol, 1,2-propanediol, 1,5-pentandiol, amylalcohol, 2-methyl-1-pentanol, 3-methyl-1-pentanol, 2-methyl-2-pentanol, 3-methyl-2-pentanol, 4-methyl-2-pentanol, 2-methyl-3-pentanol, 3-methyl3-pentanol, hexanol, ethyl hexanol, heptanol, 3-heptanol, 2-methyl-2,4-pentandiol, 2-ethyl-1,3-hexandiol, octanol, 1-octanol, 2-octanol, decanol, dodecanol, cyclohexanol, tri-ethylene glycol, di-ethylene glycol, tetra-ethylene glycol, tetra-hydrofurfuryl alcohol, or mixtures thereof.

The organic solvent substituted with oxygen may comprise ethylene glycol monoethyl ether, ethylene glycol dimethyl ether, ethylene glycol monomethyl ether, ethylene glycol monobutyl ether, diethylene glycol monoethyl ether or diethylene glycol monobutyl ether, diethylene glycol diethyl ether, diethylene glycol dimethyl ether, diethylene glycol monomethyl ether, 1,4-dioxane, or mixtures thereof.

The organic solvent substituted with ketone group comprises butyl methyl ketone, methyl-ethyl ketone, 4-hydroxy-4-methyl-2-pentanone, cyclopentanone, diacetone alcohol, 4-methyl-pentanone, 4-methyl-2-pentanone, or mixtures thereof.

Also the organic solvent may comprises common organic solvents such as diethyl carbonate, benzyl acetate, dimethyl glutarate, ethylacetoacetate, isobutyl isobutanoate, isobutyl acetate, meta-cresol, toluene, xylene, nitrobenzene, tetrahydrofuran, N-methyl-2-pyrolidone, dimethyl sulfoxide, N,N-dimethylformamide, or mixtures thereof.

Moreover, the radical initiator comprises ammonium persulfate, hydrogen peroxide, manganese dioxide, potassium dichromate, potassium iodate, ferric chloride, potassium permanganate, potassium bromate, potassium chlorate, or mixtures thereof. The ratio of moles of aniline to moles of radical initiator is from 0.1 to 5, preferably 0.1 to 0.75 and most preferably 0.1-0.5.

It is also preferable that step (b) of the present invention is performed in the temperature of between about −45° C. to about 40° C. Also, the radical initiator and the organic solvent comprises an organic phase, wherein the organic phase comprises about 5~95% by weight based upon total aqueous solution.

It is more preferable that the process of the present invention further comprises step (c) dedoping the conductive polymer with a base such as hydroxide compounds.

In another aspect of the present invention provide a conductive polymer synthesized by the present process, wherein the conductive polymer has a hollow quadra-angular rod shape and honeycombed network configuration. The conductive polymer synthesized by the present invention is consisted of nanometer particles, and has an apparent density in the range of about 0.03~0.19 measured in ASTM Standard D1895-6.

In still another aspect, the present invention provides a electrical conductive polymer synthesized according to the process above, wherein the polymer has an electrical conductivity of at least about 300 S/cm. Preferably, the conductive polymer has an electrical conductivity of at least about 500 S/cm, for example at least about 700 S/cm or at least about 900 S/cm, more preferably, at least about 1100 S/cm, and most preferably, at least about 1300 S/cm.

In further another aspect, the present invention provides a conductive polymer synthesized according to the present invention, wherein the conductive polymer has a hollow quadra-angular rod shape and honeycombed network configuration, wherein the conductive polymer has a repeat unit represented by the formula III below and the conductive polymer has at least one single peak at about 123 ppm of chemical shift and at about 158 ppm of chemical shift in a $^{13}C$ CPMAS NMR spectrum and/or has identifiable peaks at around 140 ppm of chemical shift in a $^{13}C$ CPMAS NMR spectrum.

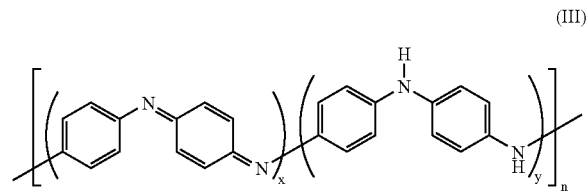

(III)

wherein x and y is respectively a molar fraction of quinonediimine structural unit and phenylenediamine structural unit in the repeating unit, and $0 \leq x \leq 1$, $0 \leq y \leq 1$ and $x+y=1$; and n is an integer of 2 or more.

The conductive polymer forms peaks at about 138 ppm of chemical shift and at about 143 ppm of chemical shift in a $^{13}C$ CPMAS NMR spectrum. Particularly, the conductive polymer has $I_{138}$ larger than $I_{143}$, wherein $I_{138}$ represents a peak intensity at about 138 ppm of chemical shift in the $^{13}C$ CPMAS NMR spectrum and $I_{143}$ represents a peak intensity at about 143 ppm of chemical shift in the $^{13}C$ CPMAS NMR spectrum. Preferably, the conductive polymer has a peak intensity ratio, $I_{138}/I_{143}$, of equal to or more than 1.2 in the $^{13}C$ CPMAS NMR spectrum. Besides, the conductive polymer has two peaks at about 1107 cm$^{-1}$ of wavelength in PAS spectrum.

In further still another aspect, the present invention provides a polyaniline having a repeat unit represented by the formula below, wherein the polyaniline has three main peaks corresponding to quaternary carbon in a solution state $^{13}C$ NMR spectrum in case the polyaniline is substituted with tert-butoxycarbonyl.

[Formula]

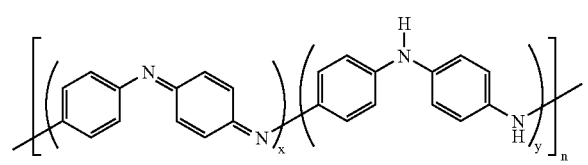

wherein x and y is respectively a molar fraction of a quinonediimine structural unit and phenylenediamine structural unit in the repeating unit, and $0 \leq x \leq 1$, $0 \leq y \leq 1$ and $x+y=1$; and n is an integer of 2 or more.

The conductive polymer synthesized according to the present invention has highly linear configuration, fewer side chains, and therefore highly improved electrical conductivity compared to polyaniline synthesized according to conventional process. Accordingly, polyaniline of the present invention may be used as various conductive films, fibers, coatings, blends with other polymers, battery electrodes, or material for organic semiconductors or organic device. Especially, polyaniline synthesized according to the present invention may be utilized as transparent electrodes, solar cells, conductive etch mask layer or for anti-corrosion, absorbency of near infrared light since composites or composition comprising polyaniline of the present invention has highly improved electrical conductivity even though low contents of polyaniline.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
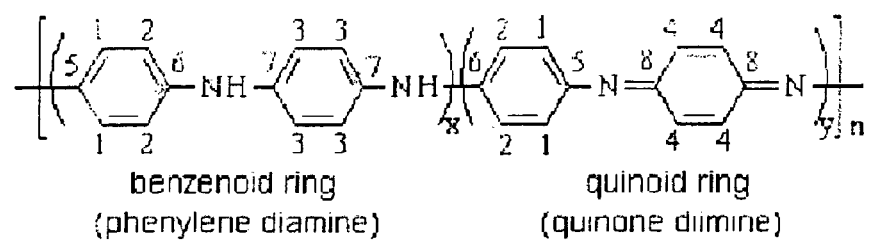
FIG. 1 is a schematic chemical structure showing the repeating unit of polyaniline synthesized according to a preferred example of the present invention for describing its particular chemical micro-structure.

Prior to describing the present invention, polyaniline or its derivatives synthesized according to the present invention will be frequently referred to as "HCPANI", while the polyaniline synthesized according to the conventional method will be referred to as "PANI" without indicated otherwise herein. Also, polypyrrole or its derivatives of the present invention will be frequently referred to as "PPy" without indicated otherwise herein. In other words, 'HCPANI' is intended herein to mean conductive polymer synthesized from anline monomer which is unsubstituted or substituted as mentioned formula I below, and refer to each or all of leucoemeraldine form, emeraldine base (EB), emeraldine salt (ES) or pernigraniline form according to the present invention.

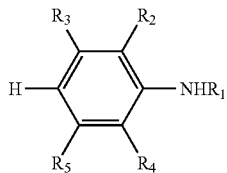

wherein $R_1$ is hydrogen, alkyl, or alkoxy group; and each $R_2$ to $R_5$ is respectively hydrogen, alkyl, alkenyl, cycloalkyl, cycloalkenyl, alkyl-thioalkyl, alkanoyl, thioalkyl, aryl-alkyl, alkyl-amino, amino, alkoxy carbonyl, alkyl sulfonyl, alkyl sulfinyl, thioaryl, sulfonyl, carboxyl, hydroxyl, halogen, nitro, or alkyl-aryl.

Also, 'PPy' is intended herein to mean conductive polymer synthesized from aniline monomer which is unsubstituted or substituted as described in formula II below according to the present invention.

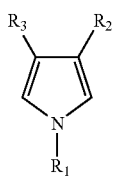

wherein each $R_1$ to $R_3$ is respectively as defined in formula I above.

In the process according to the preferred embodiment of the present invention, reactants containing monomer are mixed with 2-phase reaction system that comprises an aqueous phase and an organic solution phase. Accordingly, the present process differs from the MacDiarmid standard polymerizing process. Also, other additives, for example emulsifier, polymeric stabilizer, monomeric and/or oligomeric stabilizer, or other templates, are not required principally in the synthesizing process of the present invention. Therefore, the present process is different substantially from the conventional emulsion polymerization, suspension polymerization, or dispersion polymerization as described above. This new polymerization based upon self-stabilized dispersion concept is referred to as SSDP. The use of the term "self-stabilized" includes, but is not limited to, the stabilization of biphasic reaction systems by the reactants and polymerization products i.e., the absence of any stabilizers or antifreezes or templates. It is possible that both of two phases of the SSDP process consist of non-continuous phase or continuous phase, however, the aqueous phase may be continuous phase and the organic solution phase may be non-continuous phase, and vice versa. Particularly, the organic solution phase may be added into the reaction system of 5~95% by weight based on a total aqueous phase.

The aqueous phase in the reaction system of the present invention comprises a hydrophilic solvent such as water, a monomer, for example a monomer defined in formula I or formula II above, and an acid, preferably protonic acid, in initiating reaction.

The hydrophilic solvent may comprise water, methanol, ethanol, acetonitrile, 2-methoxy ethanol, or mixtures thereof, and preferably water alone. The acid may be an inorganic acid or an organic acid which preferably has pKa of equal to less than 4.0, more preferably equal to or less than 3.5, and most preferably a protonic acid. Particularly, the acid may comprise an inorganic acid selected from the group consisting of hydrochloric acid, sulfuric acid, nitric acid, or phosphoric acid, or an organic acid such as an aryl sulfonic acid or an alkyl sulfonic acid, which is unsubstituted or substituted with halogen, or mixtures thereof. More specifically, the organic acid may comprise an alkyl sulfonic acid such as methyl sulfonic acid, or ethyl sulfonic acid, halogenated alkyl sulfonic acid, for example chloro sulfonic acid or trichloro sulfonic acid, aryl sulfonic acid such as dodecyl benzene sulfonic acid, anthraquinone2-sulfonic acid, 5-sulfosalicylic acid or camphor sulfonic acid, or mixtures thereof. Preferably, the acid may comprise an inorganic acid such as hydrochloric acid, sulfuric acid, nitric acid, or phosphoric acid.

The organic solution phase in the reaction system of the present invention comprises an organic solvent, preferably immiscible or miscible a little with the aqueous phase or an organic solvent that may be separated and dispersed with the aqueous phase by soluble self oriented material, which is disclosed in international patent publication No. WO-02/074833 to the present inventors.

In case of choosing an organic solvent that may be used in synthesizing polymers, a solubility parameter, which is related with the g molecular weight, density of the polymers, should be considered. Reactions using various organic solvents also produce polyanilines of improved chemical microstructure with similar shapes and conductivity. In a preferred embodiment of the present invention, the organic acid constituted with the organic solution phase may comprise an organic solvent having the solubility parameter of between about 17 and about 29.

In a preferred embodiment of the present invention, the organic solvent may comprise hydrocarbons, such as aliphatic, alicyclic, or aromatic hydrocarbons, unsubstituted or substituted with hydroxyl, halogen, oxygen, ketone, or carboxyl group, or common organic solvents that may be used in synthesizing conductive polymers. The hydrocarbons may be halogen-substituted hydrocarbons such as alkyl halides, ether, alicyclic hydrocarbons or aromatic hydrocarbons. The hydrocarbons substituted with hydroxyl group comprises $C_3$~$C_{15}$ alcohols.

Preferably, the halogen-substituted hydrocarbons comprise a) alkyl halides such as dichloromethane, pentachloro ethane, 1,1,2,2-tetrachloro ethane, trichloro ethane, trichloro ethylene, dichloro methane, chloroform, ethyl bromide, ethyl chloride, dichloro propane, trichloro ethane, or mixtures thereof; b) ether such as bis(2-chloroethyl)ether, dichloro ethyl ether, or mixture thereof; and c) aromatic hydrocarbons such as 1,2-dichloro benzene. Besides, the organic solvent substituted with hydroxyl group may comprise 1-propanol, 2-methyl-2-propanol, 1,2-dipropandiol, 1,3-propandiol, isopropyl alcohol, butanol, neopentanol, 2-methoxy ethanol, 2-butoxy ethanol, 2-ethyl-1-butanol, 3-methyl-1-butanol, 2-methyl-2-butanol, 3-methyl-2-butanol, 1-pentanol, 2-pentanol, 3-pentanol, 1,2-propanediol, 1,5-pentandiol, amylalcohol, 2-methyl-1-pentanol, 3-methyl-1-pentanol, 2-methyl-2-pentanol, 3-methyl-2-pentanol, 4-methyl-2-pentanol, 2-methyl-3-pentanol, 3-methyl3-pentanol, hexanol, ethyl hexanol, heptanol, 3-heptanol, 2-methyl-2,4-pentandiol, 2-ethyl-1,3-hexandiol, octanol, 1-octanol, 2-octanol, decanol, dodecanol, cyclohexanol, tri-ethylene glycol, di-ethylene glycol, tetra-ethylene glycol, tetra-hydrofurfuryl alcohol, or mixtures thereof.

Also, the hydrocarbons substituted with oxygen may comprise ethylene glycol monoethyl ether, ethylene glycol dimethyl ether, ethylene glycol monomethyl ether, ethylene glycol monobutyl ether, diethylene glycol monoethyl ether or diethylene glycol monobutyl ether, diethylene glycol diethyl ether, diethylene glycol dimethyl ether, diethylene glycol monomethyl ether, 1,4-dioxane, or mixtures thereof.

The organic solvent substituted with ketone group comprises butyl methyl ketone, methyl-ethyl ketone, 4-hydroxy-4-methyl-2-pentanone, cyclopentanone, diacetone alcohol, 4-methyl-pentanone, 4-methyl-2-pentanone, or mixtures thereof.

Besides, the organic solvent can be used in the present invention comprises diethyl carbonate, benzyl acetate, dimethyl glutarate, ethylacetoacetate, isobutyl isobutanoate, isobutyl acetate, meta-cresol, toluene, xylene, nitrobenzene, tetrahydrofuran, N-methyl-2-pyrolidone, dimethyl sulfoxide, N,N-dimethylformamide, or mixtures thereof.

Further, the radical initiator, which is added in the aqueous phase according to the present SSDP process, may comprise ammonium peroxisulfate, hydrogen peroxide, manganese dioxide, potassium dichromate, potassium permanganate, potassium bromate, potassium chlorate, or mixture thereof, and preferably ammonium peroxisulfate. In case of using ammonium peroxisulfate as oxidizing agent or radical initiator, two electrons per 1 mole are related, and therefore, radical initiator can be used about 0.1~5 molar equivalent, preferably about 0.1~0.75 molar equivalent, and most preferably about 0.1~0.5 molar equivalent (per 1 mole of monomer).

Angelopulos et al. reported that the solubility of the synthesized polymers and stability of polymer solution is reciprocal to the amount of the radical initiator (See Angelopulos et al., Synth. Met. 84, 35, 1997). Accordingly, it is important to control the addition procedure of the initiator as well as the amount of the initiator in the present invention. The addition procedure of the initiator may have an affect on the micro-chemical structures of synthesized polymers because the radical initiator has an affect on the hydrolysis of intermediates synthesized in the polymerization step.

The polymerization reaction of the present invention is exothermal reaction, and therefore, preferably the reactants are stirred during the reaction. The reaction may be performed in the temperature of −45° C. to 45° C., such as −45° C. to 40° C. Preferably, the reaction should be performed at suitable temperature, which can be determined by desired molecular weight, molecular weigh distribution, or electrical conductivity of the synthesized polymers, among the above temperature ranges and keep it during the polymerization reaction because the reaction time and the molecular weigh of the polymers depends on the reaction temperature.

The above reactants are introduced into a reaction vessel to initiate polymerization. After completing the polymerization reaction, the synthesized polymers may be separated with various methods according to desired formation of final product. For example, highly conductive polyaniline (HCPANI) synthesized according to the preferred embodiment of the present invention is washed with water or methanol, and recovered to obtain emeraldine salt (ES) powder. The ES powder is treated with a base to form emeraldine base (EB) which is very soluble in organic solvents. The EB form may be doped with various dopants to reprocess it or processed to dope it for various applications. Or the obtained EB may be manufactured easily to leucoemeraldine form or pernigraniline form by redox reaction.

The SSDP process has main advantage of being able to control molecular weight of produced conductive polymers over the conventional methods. In a preferred embodiment of the present invention, conductive polymers with a molecular weight of between about 10,000 and about 385,000 can be obtained by only changing the reaction conditions such as reaction time, temperature, and the likes. Especially, electrical conductive polymers of the present invention had an intrinsic viscosity of about 0.1 to about 2.9 determined at 30° C. after the conductive polymers were dissolved in sulfuric acid with a concentration of 0.1 g/dl. Also, the electrical conductive polymers, especially EB, synthesized according to the present invention has remarkably differentiating micro-chemical structure and highly enhanced electrical conductivity compared to EB synthesized according to the conventional method.

It has been only known that the polyaniline of EB form synthesized according to the conventional method has a fraction ratio of x to y in formula III above of about 1:1. In other words, the micro-chemical structure of the polyaniline has not been discovered. On the other hands, HCPANI, which has highly enhanced electrical conductivity and is synthesized according to the present SSDP invention, has remarkably differentiating chemical microstructure compared to the conventional PANI. The differences in chemical structure between the HCPANI and PANI will be more described in more detail referring the appended drawings.

It is only known that the polyaniline of EB form synthesized according to the conventional method has a fraction ratio of x to y in formula above of about 1:1. In other words, the microstructure of the polyaniline has not been fully discovered. On the other hands, HCPANI, which has highly enhanced electrical conductivity and is synthesized according to the present invention, has remarkably characteristic chemical microstructure compared to the conventional PANI. The differences in chemical structure between the HCPANI and PANI will be more described in more detail referring the appended drawings.

Figure 2:
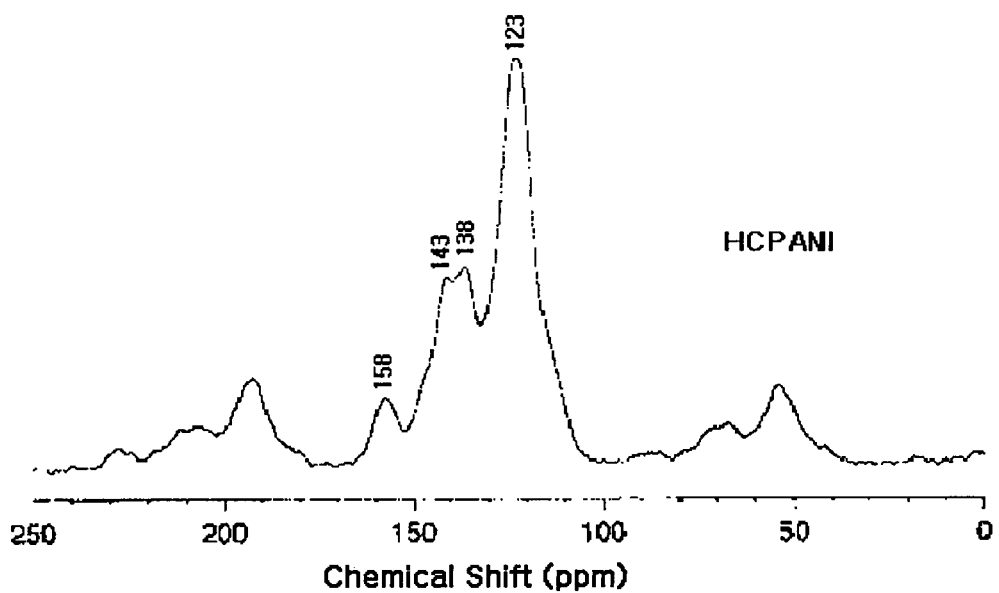
FIG. 2 shows a spectrum resulted from $^{13}C$ CPMAS NMR analysis for highly conductive polyaniline (HCPANI) synthesized according to a preferred example of the present invention.
Figure 3:
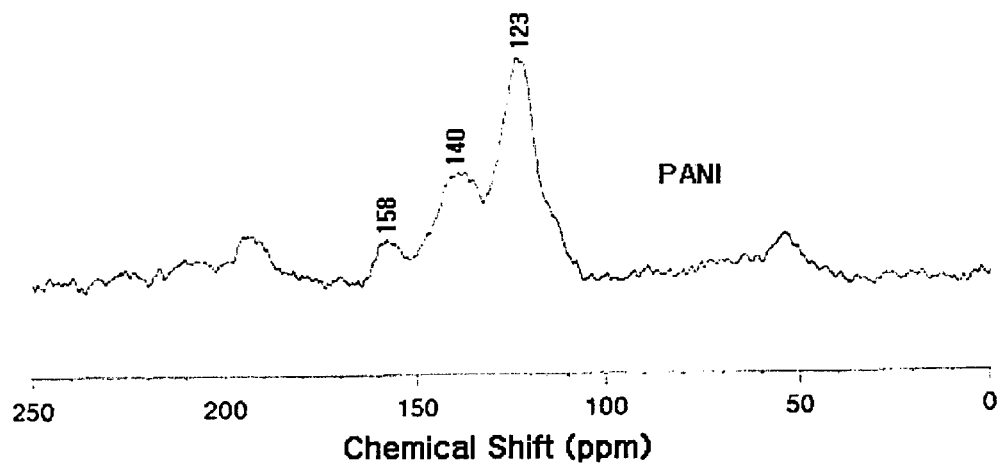
FIG. 3 shows a spectrum resulted from $^{13}C$ CPMAS NMR analysis for polyaniline (PANI) synthesized according to a conventional process.

FIG. 1 is a schematic formula showing a repeating unit of polyaniline with carbon numbers for describing its micro-chemical structure. FIG. 2 shows a spectrum resulted from $^{13}C$ CPMAS NMR analysis for highly conductive polyaniline (HCPANI) synthesized according to a preferred example of the present invention. FIG. 3 shows a spectrum resulted from $^{13}C$ CPMAS NMR analysis for polyaniline (PANI) synthesized according to a conventional process.

As shown in FIG. 2 or 3, HCPANI, which synthesized according to the present invention, has two apparent separated peaks around 140 ppm of chemical shift, that is one peak at about 138 ppm ($I_{138}$) and the other peak at about 143 ppm ($I_{143}$) in $^{13}C$ CPMAS (Cross-Polarized Magnetic-Angle-Spinning) NMR spectrum (FIG. 2). On the other hand, PANI has blurring multiple peaks at around 140 ppm in $^{13}C$ CPMAS NMR spectrum (FIG. 3).

According to Raghunathan et al., the two peaks ($I_{138}$ and $I_{143}$ in FIG. 2) at around 140 ppm of chemical shift in $^{13}C$ CPMAS NMR analysis of the polyaniline of EB form corresponds to protonated carbons connected to hydrogen of quinoid ring in repeating unit of polyaniline of EB form shown in FIG. 1 (Raghunathan et al., Synth. Met. 81, 39~47, 1996; Yasuda et al., Synth. Met. 61, 239~245, 1993).

However, it is difficult to certify specific peaks at around 140 ppm in $^{13}C$ CPMAS NMR spectrum of the PANI synthesized according to the conventional method because there are many small peaks at around 140 ppm of chemical shift as shown in FIG. 3. On the other hand, it was determined that the HCPANI synthesized according to the present invention has two or more apparently confirmable peaks, $I_{143}$ and $I_{138}$, a shoulder at around 140 ppm of chemical shift in $^{13}C$ CPMAS NMR spectrum as shown in FIG. 2. Besides, it was determined that the HCPANI had higher peak intensity at about 138 ppm of chemical shift than peak intensity at about 143 ppm of chemical shift in $^{13}$C CPMAS NMR spectrum ($I_{138} > I_{143}$). That relationship between peak intensities at specific chemical shifts in $^{13}$C CPMAS NMR analysis is one characteristic of HCPANI synthesized according to the present invention, which is remarkably different from peak forms in $^{13}$C CPMAS NMR spectrum for PANI synthesized according to the conventional method.

HCPANI synthesized according to the present invention has two noticeably confirmable peaks at about 140 ppm in $^{13}$C CPMAS NMR spectrum, because the quinoid ring (quinonediimine structural unit) in the repeating unit of HCPANI in FIG. 1 is connected through immine bonds and thereby not being able to rotate and having bended form of —N=bonding instead of maintaining linear form. Therefore, 4 carbon atoms (C4) on the quinoid ring shown in FIG. 1 lose equivalences. Accordingly, we may infer that HCPANI synthesized according to the present invention has nearly theoretically ideal structure of polyaniline as shown formula above. On the other hand, since PANI synthesized according to conventional method has defects in quinoid ring, PANI has different structure from the structure of formula above. Accordingly, it is difficult to certify specific peaks at around 140 ppm of chemical shift in $^{13}$C CPMAS NMR spectrum of PANI, which has many indistinguishable peaks around 140 ppm.

Wei et al. reported that Michael addition reaction of aniline monomer might be happened on the quinoid ring as shown below. Therefore, we think that PANI has other micro-chemical structures than HCPANI.

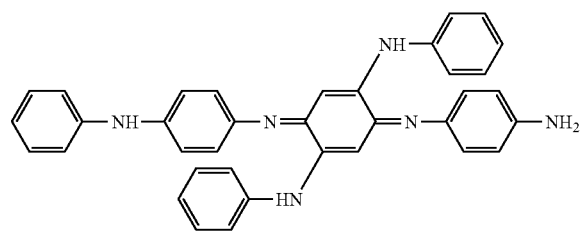

Further, HCPANI synthesized according to the present invention has a single or unique peak at about 123 ppm of chemical shift or about 158 ppm of chemical shift in $^{13}$C CPMAS NMR spectrum as shown in FIG. 2. On the other hand PANI synthesized according to the conventional method shows 2 or more unidentifiable peaks at about 123 ppm of chemical shift and at about 158 ppm of chemical shift $^{13}$C CPMAS NMR spectrum as shown in FIG. 3

In relation to the differences of peak formation between HCPANI and PANI in $^{13}$C CPMAS NMR spectrum, a single peak at about 123 ppm of chemical shift in $^{13}$C CPMAS NMR spectrum corresponds to carbon atoms C1 and C2 of benzenoid ring (phenylenediamine structural unit), which may be rotated a bit in molecules, of the repeating unit of polyaniline in FIG. 1. HCPANI had an equivalent unique or single peak at about 123 ppm in $^{13}$C CPMAS NMR spectrum (FIG. 2), while PANI showed divided peaks, not unique peak, at about 123 ppm in $^{13}$C CPMAS NMR spectrum (FIG. 3). In other words, it is certified that HCPANI of the present invention has equivalent carbon atoms in benzenoid ring, while PANI does not have equivalent carbon atoms in benzenoid ring.

Yasuda et al., synthesized polyaniline by adopting Cao et al. (Cao et al., Polymer, 30, 2305, 1989) with using $FeCl_3$ instead of ammonium persulfate which is commonly used in conventional chemical oxidation method for producing polyaniline (See Yasuda et al., Synth. Met. 61, 239–245, 1993). However, solid state polyaniline synthesized according to Yasuda et al. did not have distinguishable peak, but had only indistinguishable small peaks, at about 138 ppm of chemical shift in $^{13}$C CPMAS NMR spectrum, and showed the peak intensity at about 138 ppm of chemical shift was lower than the peak intensity at about 143 ppm of chemical shift.

In other words, conventional PANI has many indistinguishable small peaks at about 138 ppm of chemical shift in $^{13}$C CPMAS NMR analysis, and the peak intensity at about 138 ppm is weaker than the peak intensity at about 143 ppm of chemical shift. On the other hand, HCPANI synthesized according to the present invention has two or more noticeably distinguished peaks at around 140 ppm in $^{13}$C CMPAS NMR analysis. HCPANI synthesized according to the present invention has few defects at carbons on the quinoid rings of repeating units of polyaniline and aniline monomers is bonded through para-coupling in polymerization. Such differences in micro-chemical structures cause HCPANI to having much higher electrical conductivity compared to conventional PANI.

Therefore, it is concluded that HCPANI synthesized according to the preferred embodiment of the present invention has no, or little defects in carbons formed on the quinoid ring in the repeat unit thereof and that aniline monomer is synthesized to the para position of another aniline monomer or oligomeric anilines in polymerization, and therefore, HCPANI of the present invention has apparent distinguishable peak at each about 158 ppm, around 140 ppm, or about 123 ppm in $^{13}$C CPMAS NMR spectrum. Such differences in micro-chemical structure cause HCPANI of the present invention to have much enhanced electrical conductivity compared to conventional polyaniline (PANI).

Figure 4:
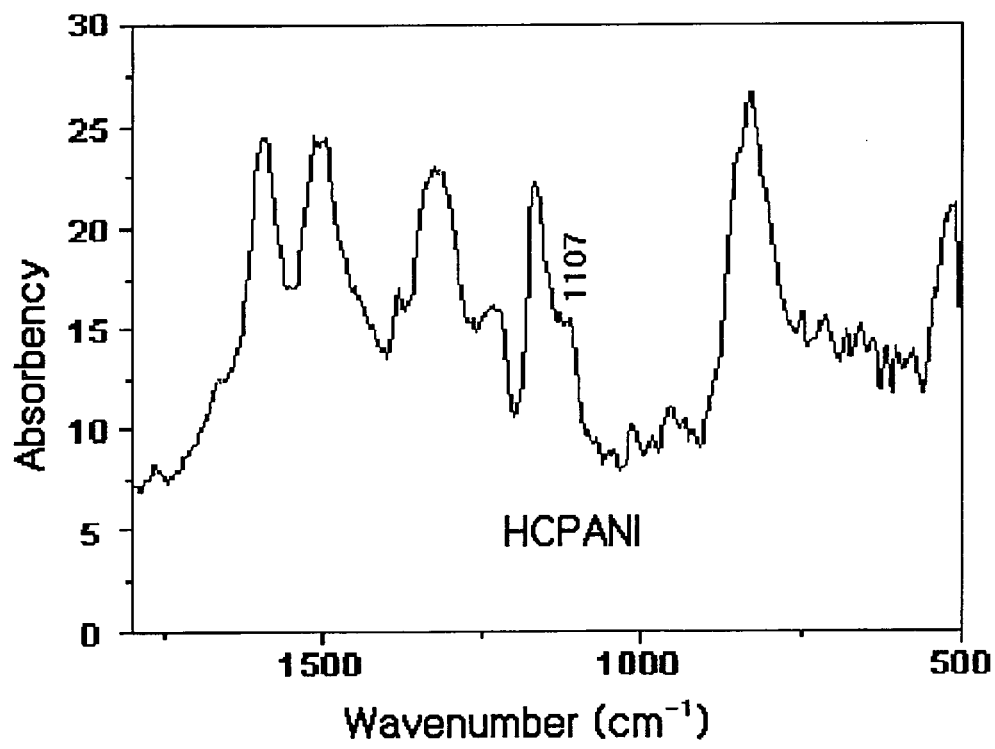
FIG. 4 shows a spectrum resulted from PAS analysis for highly conductive polyaniline (HCPANI) synthesized according to a preferred example of the present invention.
Figure 5:
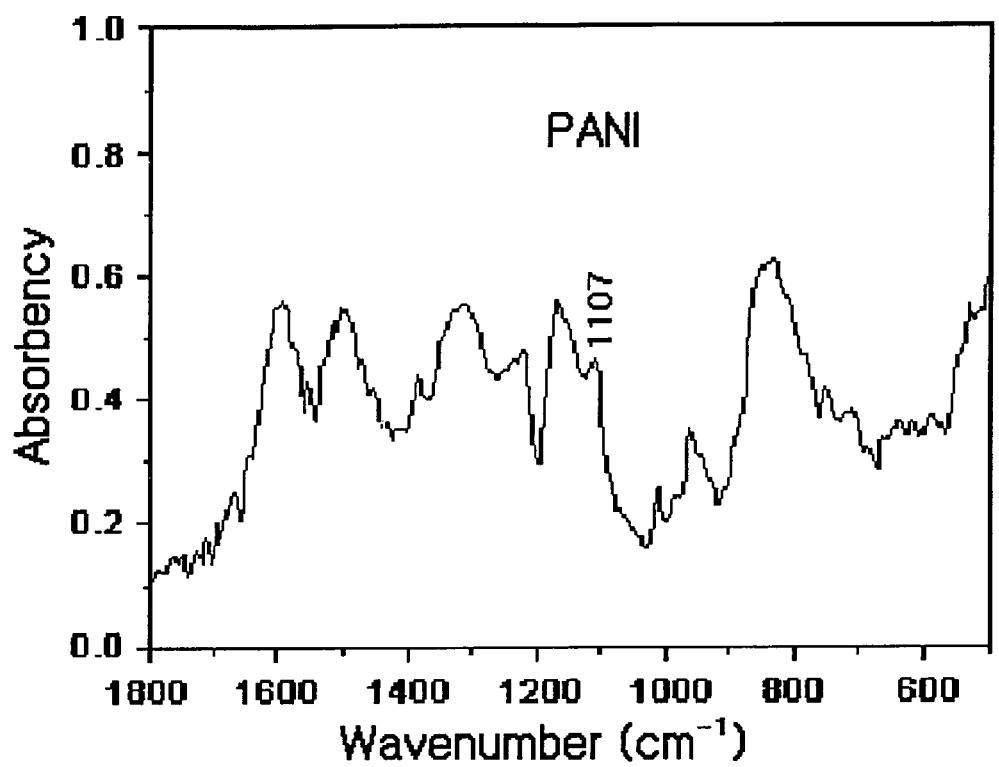
FIG. 5 shows a spectrum resulted from PAS analysis for polyaniline (PANI) synthesized according to a conventional process.

HCPANI synthesized according to the present SSDP process has noticeably spectrum in PAS analysis. FIGS. 4 and 5 are respectively a graph obtained from Photo Acoustic Spectroscopy (PAS) results which are suitable for obtaining infrared spectrum of polymeric powders such as polyaniline. FIG. 4 shows a spectrum obtained from PAS analysis for HCPANI powder synthesized according to the present invention, while FIG. 5 shows a spectrum obtained from PAS analysis for PANI powder synthesized according to conventional method. It is generally known that morphology of samples has a little affect on absorbency of samples and does not have to do with photometry of samples in PAS analysis. The analytical results shown in FIGS. 4 and 5 were obtained by treating the powder forms of HCPANI and PANI under the same analytical conditions, and then comparing quantitatively the infrared absorbencies.

Among infrared absorbency peaks of PAS analysis in FIGS. 4 and 5, the peak at about 1107 cm$^{-1}$ of wavelength is assigned to the ring stretching vibration of the amine (C—N) group in the repeating unit of polyaniline. HCPANI powder has other infrared absorbency peaks at about 1107 cm$^{-1}$ of wavelength than the PANI powder synthesized according to the conventional method. HCPANI synthesized according to the present invention has two separated peaks at about 1107 cm$^{-1}$ of wavelength and the peak intensity at about 1107 cm$^{-1}$ of wavelength ($I_{1107}$) is relatively weak in PAS analysis. (FIG. 4). On the other hand, PANI synthesized according to the conventional method has a unique peak at about 1107 cm$^{-1}$ of wavelength and $I_{1107}$ is relatively strong (FIG. 5).

In accordance with the preferred example, the peak formation at about 1107 cm$^{-1}$ of wavelength in PAS spectrum is closely related to electrical conductivity of polymers and resulted from structural differences between HCPANI and PANI. In other words, HCPANI has two relatively weak peaks at about 1107 cm$^{-1}$, while PANI has a relatively strong unique peak at about 1107 cm$^{-1}$ of wavelength in PAS spectra.

Besides, it was certified that molecular weight of the conductive polymer synthesized in the preferred example is closely related to the electrical conductivity. For example, HCPANI synthesized according to the preferred example of the present invention with number average molecular weights of about 10,000~30,000 has electrical conductivity of about 100~300 S/cm, while HCPANI with number average molecular weights of about 30,000~89,000 has electrical conductivity of about 300~1300 S/cm. In other words, electrical conductivity depends on the molecular weight.

Further, the conductive polymers synthesized according to the preferred examples of the present invention have enhanced solubility compared to the conventional polymers. In case HCPANI of conductive EB form has a number average molecular weight of 15,000, it has solubility of about 10% (w/w) in NMP at room temperature, which is about twice as solubility of polyaniline of EB having the same molecular weight, which is about 5% (w/w) in NMP. Especially, HCPANI with a number average molecular weight of 15,000~18,000 (intrinsic viscosity of 1.7~2.7 dl/g) has solubility of equal to or more than 3% (w/w) in NMP, which is much higher than solubility of conventional polyaniline with the same molecular weight, which is less than 2% (w/w) in MMP.

The solubility differences between HCPANI of the present invention and the conventional PANI result from the structural differences between them as well as from particle forms or formation in the polymerization. It was certified that the conductive polymers synthesized according to the preferred examples of the present invention have specific particle structure or network configuration because they are polymerized in the reaction system which comprises the aqueous phase and the organic solution phase but can be self-stabilized.

Figure 6A:
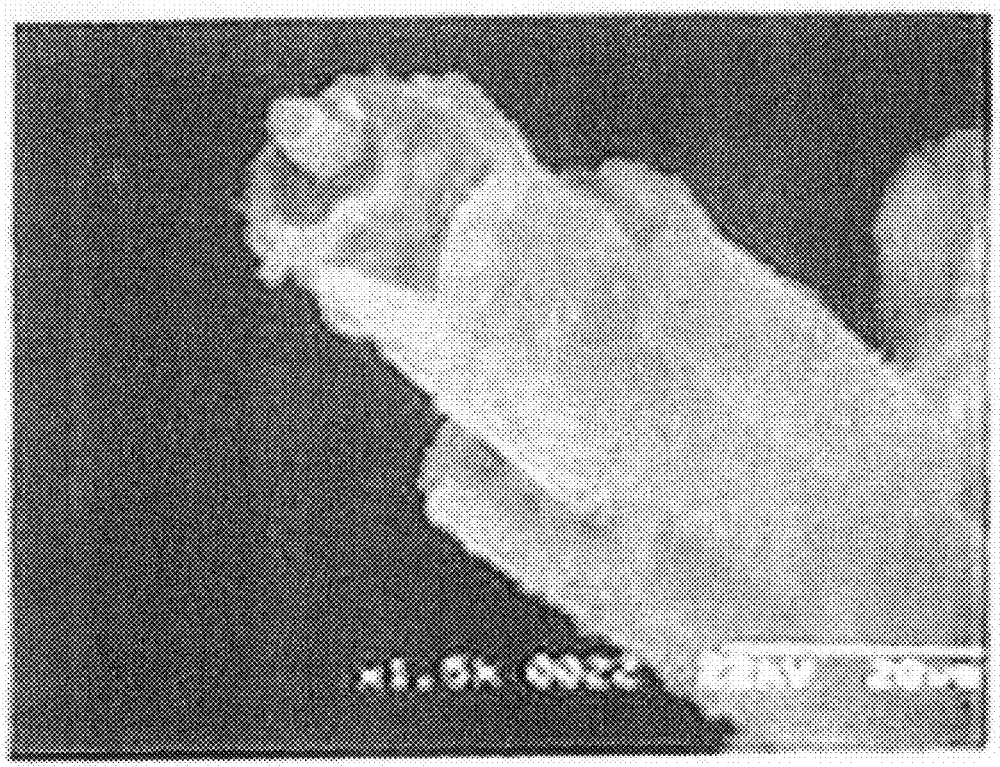
FIGS. 6A to 6F show respectively SEM electron microscopy of highly conductive polyaniline of emeraldine base form (HCPANI) synthesized according to the preferred examples of the present invention.
Figure 6B:
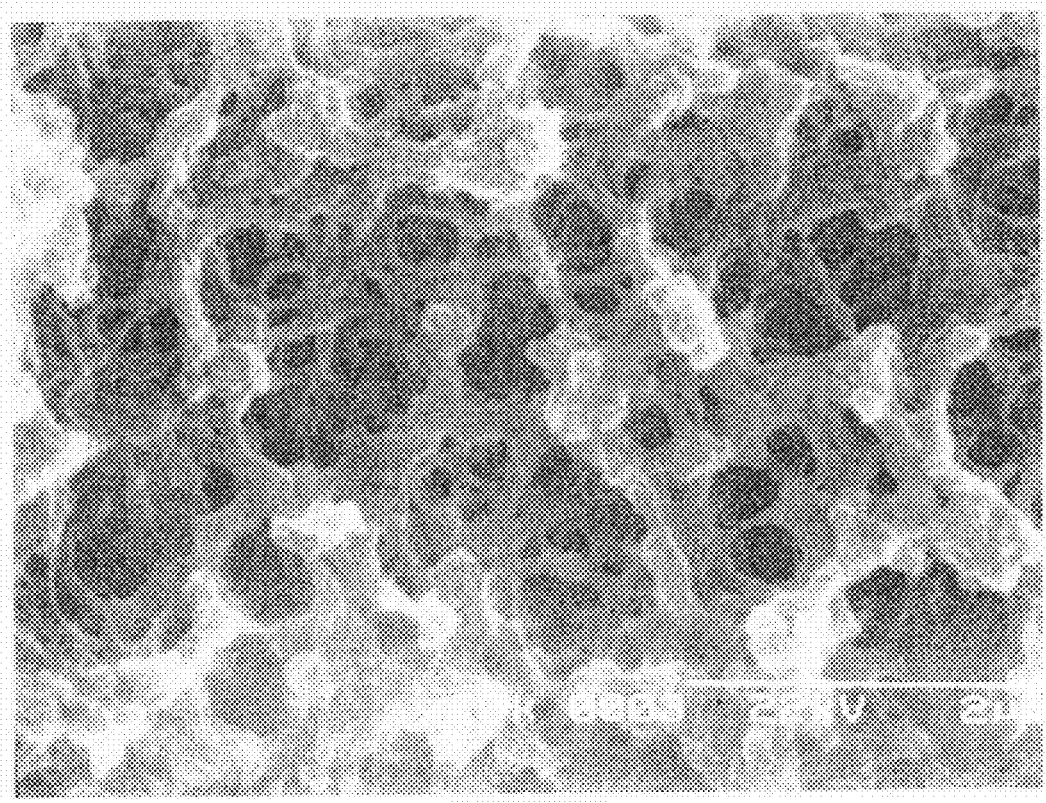
Figure 6C:
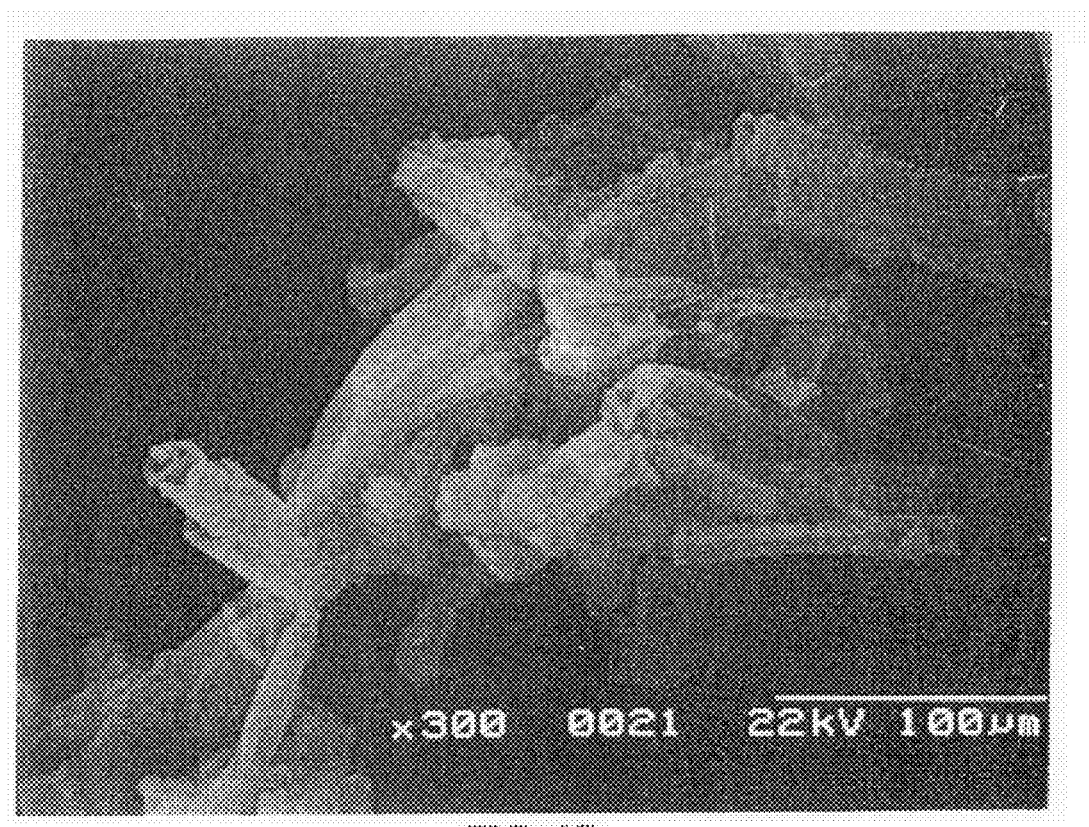
Figure 6D:
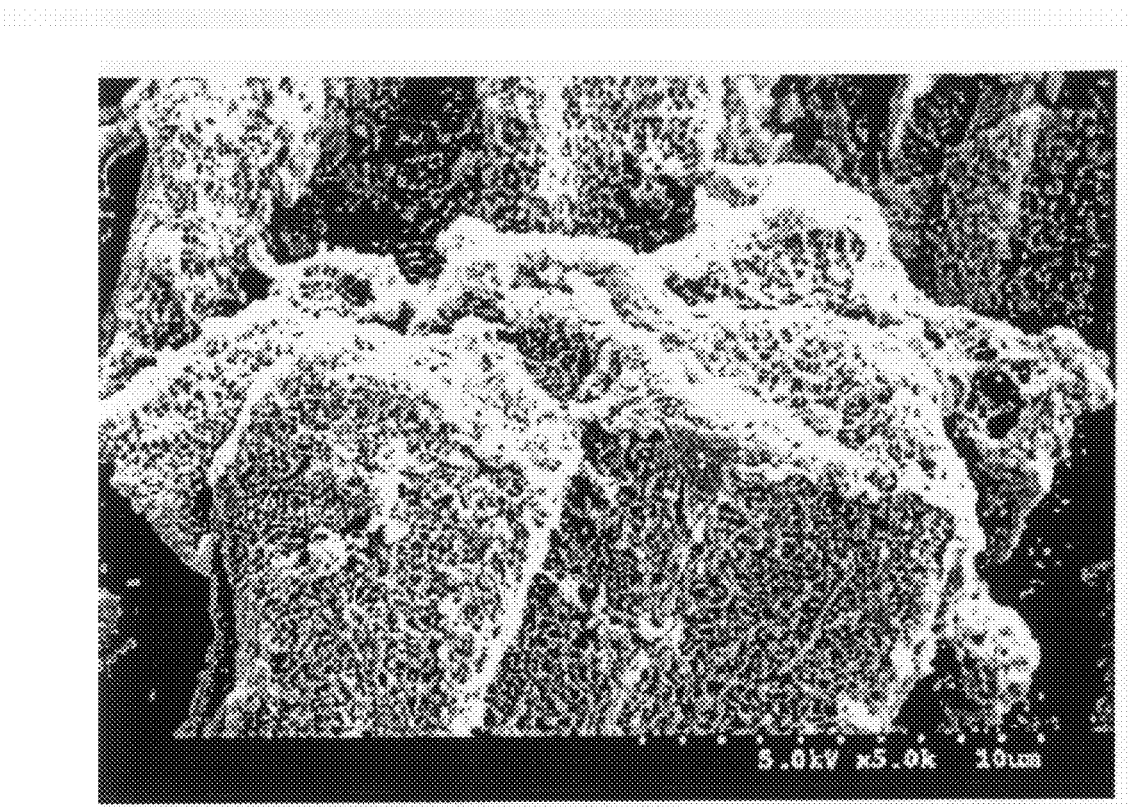

FIGS. 6A to 6F respectively shows SEM electron microscopy of highly conductive polyaniline of emeraldine base form (HCPANI) synthesized according to the preferred examples of the present invention, and FIGS. 7A to 7E respectively shows SEM electron microscopy of polyaniline of emeraldine base form (PANI) synthesized according to the conventional process. As shown in FIGS. 6A to 6F, HCPANI of EB form synthesized according to the present invention has cross-sections with various lengths from about 10 nm to about 50 μm, particularly in particles of barrel shapes (FIGS. 6A and 6C). More specifically, each of the HCPANI of the present invention has common structure of having internal holes like foamed-shapes or honey-comb shapes or having a plurality of compact hollow quadra-angular rod or quadra-angular bar.

Figure 6E:
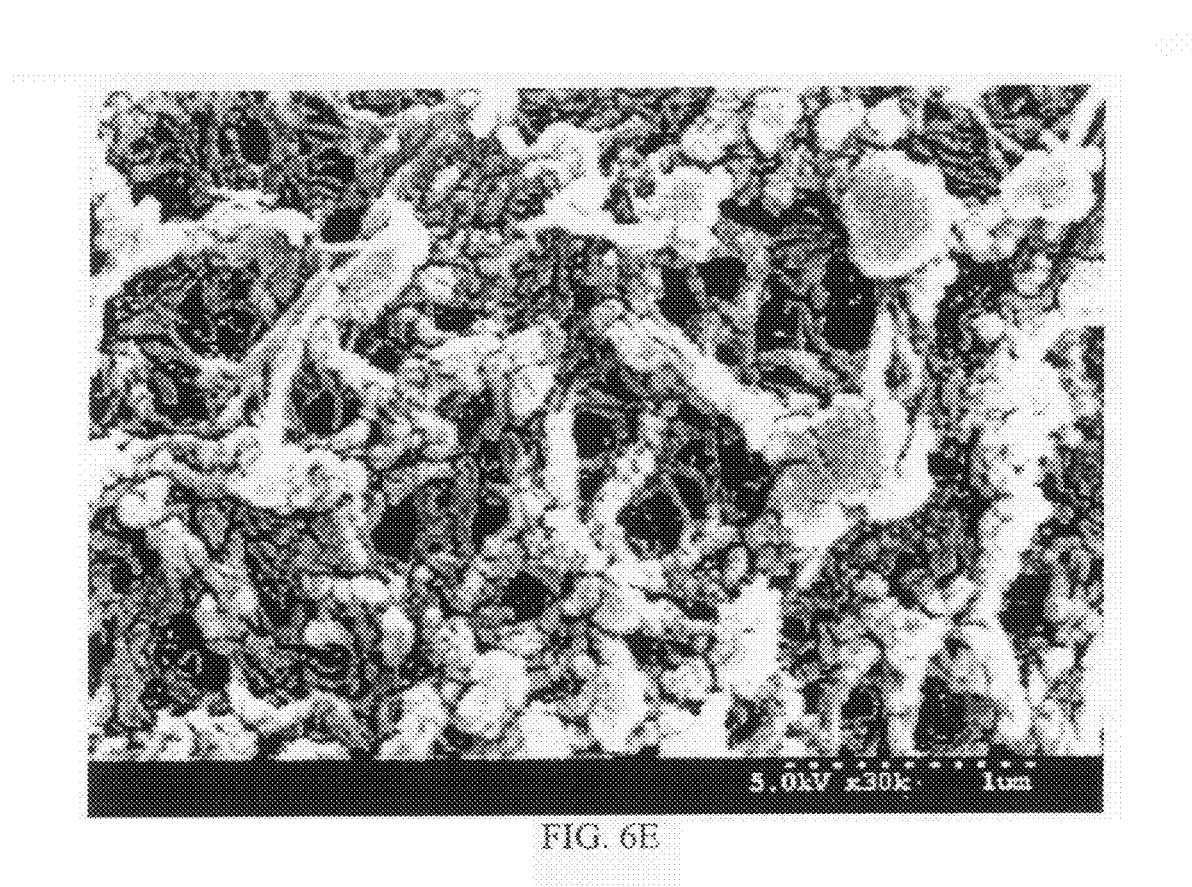
Figure 6F:
Figure 7A:
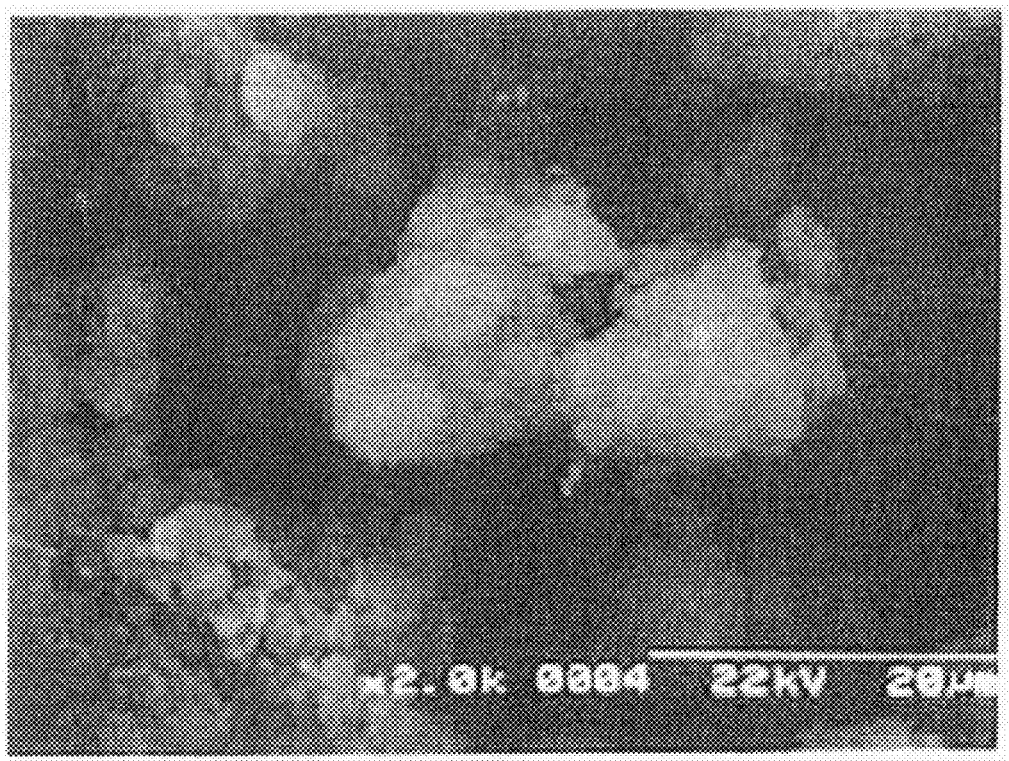
FIGS. 7A to 7B show respectively SEM electron microscopy of polyaniline of emeraldine base form(PANI) synthesized according to the conventional process.
Figure 7B:
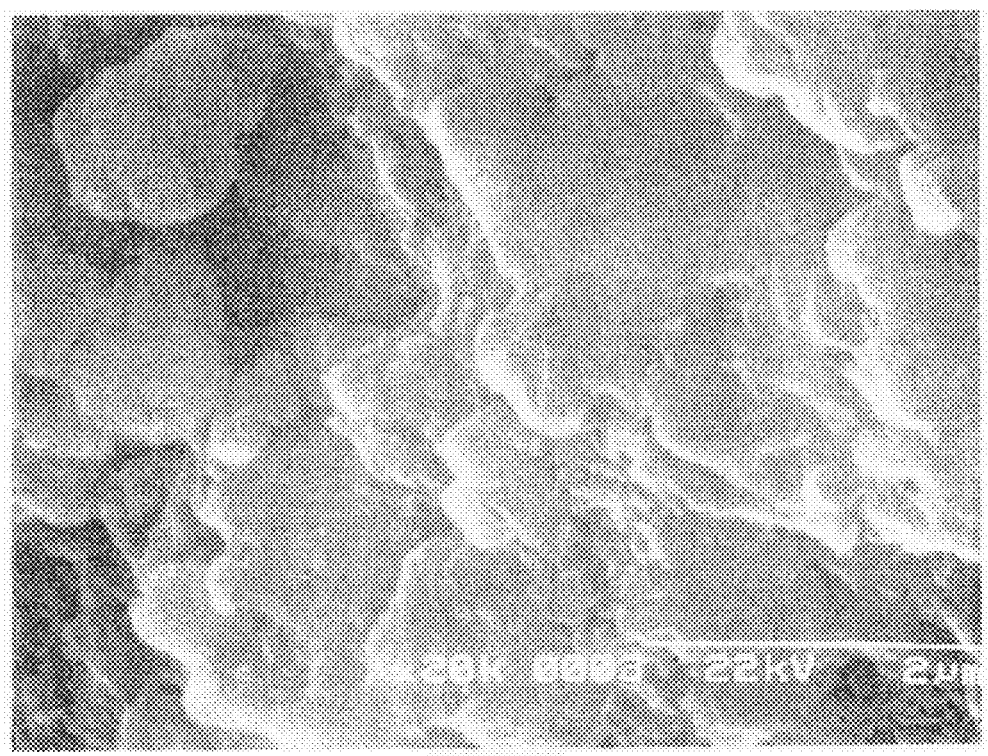

Specifically, HCPANI has a plurality of globular particles of 20~80 nm, which is clustered to form specific network configuration like bunches of grapes as shown in FIG. 6E, which shows 30,000 times enlarged SEM electron microscopy of HCPANI. Such a structure allows HCPANI of the present invention to have much increased surface areas compared to conventional polyaniline. In contrast, it was observed that PANI synthesized according to the conventional method forms particles of precipitates as shown in FIGS. 7A and 7B.

According to Mandal et al., polyaniline synthesized by dispersion polymerization has common compact structure or configuration even though it has various forms such as needle shape, oblong shape, or spherical shape (See Mandal et al., Langmuir 12, p 1585, 1996). Besides, Huang et al. reported that polyaniline of nano-fiber form can be obtained by dissolving respectively an aniline monomer in an organic solvent and an initiator in water and then synthesizing the mixture solution in the interface (See Huang et al., J. Am. Chem. Soc., 126, p 314, 2003, Angew. Chem. Int. Ed., 43, p5817, 2004). However, HCPANI synthesized according to the preferred examples of the present invention has a sort of a network configuration, which results in increasing surface area of HCPANI particles and thereby enhancing solubility thereof. In relation with the network configuration, it was calculated that HCPANI of the present invention had apparent density of between 0.03 g/ml and 0.19 g/ml measured in ASTM standard D1895-6, which is very low compared to conventional polyaniline.

As mentioned above, the conductive polymers synthesized according to the preferred examples of the present invention has much enhanced electrical conductivity and solubility compared to conventional conductive polymers. However, in case of increasing the electrical conductivity and solubility of conductive polymers, other additives may be added into the reaction system as templates. For example, precursors of soluble self oriented materials such as a precursor represented by the structure below, disclosed in Example 3 of international patent publication WO 02-074833 to the present inventors may be mixed with the monomers as templates into the reaction system.

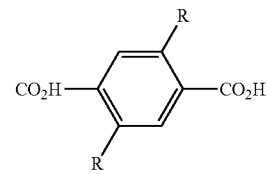

wherein each R is —(CH$_2$)$_n$CH$_3$, —O(CH$_2$)$_n$CH$_3$, —O(CH$_2$CH$_2$)$_n$OCH$_3$, wherein n is integers between 1 and 24.

The soluble self oriented materials represent by the above structure may be added into the reaction system of about 5~30% by weight, preferably 5~25% by weight, and more preferably 10~20% by weight based on the monomers.

Particularly, the soluble self oriented materials can be mixed with the monomers is a material R is —O(CH$_2$)$_n$CH$_3$ (n is integers between 1 and 24) in the structure above. Preferably, the soluble self oriented materials have side chain (R) of which terminal end may have substituted with sulfonic acid (SO$_3$H), carboxylic acid (—COOH), benzene sulfonic acid (—U6H4Sob 3H), benzene carboxylic acid (—U6H4COOH), azacrownether, carbazole, thiol (—SH) group.

The synthesizing method of the soluble self oriented material which may be added in the reaction system of the present invention as template is described in detail in international patent publication No. WO 02-074833.

Figure 9:
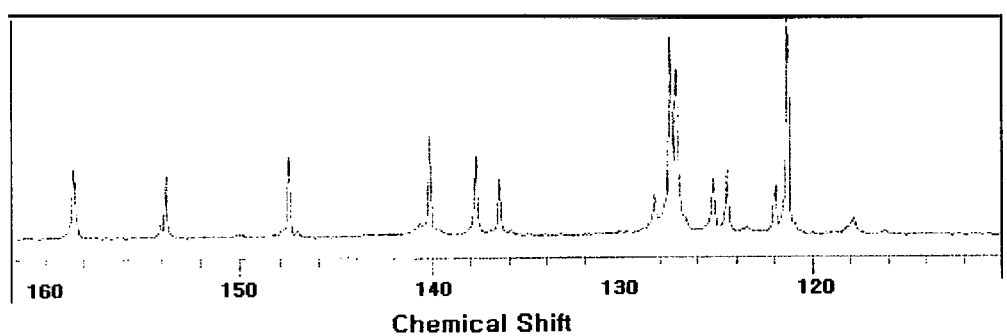
FIG. 9 a spectrum resulted from solution state $^{13}C$ NMR analysis for polyaniline synthesized according to the preferred example of the present invention.

Moreover, it was determined that HCPANI synthesized according to the present invention has well-defined microchemical structures. FIG. 9 shows a spectrum resulted from $^{13}$C NMR analysis for polyaniline substituted with tert-butoxycarbonyl (t-BOC) of the present invention. The microchemical structure was investigated for polyaniline derivative prepared by substituting with tert-butoxycarbonyl (t-BOC) to enhance solubility in common organic NMR solvents such as CDCl$_3$.

HCPANI-tBOC of the present invention has four main distinguishable peaks between at about 139.5 ppm of chemical shift and at about 160 ppm of chemical shift in solution state $^{13}$C NMR spectrum. Among four main peaks, three peaks formed at about 140 ppm, about 148 ppm, and about 159 ppm of chemical shift in solution state $^{13}$C NMR spectrum corresponds to quaternary carbons of HCPANI-tBOC. Therefore, it was certified that HCPANI-tBOC of the present invention forms three main peaks relating to quaternary carbons.

The present invention will be explained in more detail through the following non-limiting examples. However, the present invention will not be limited to the following examples.

EXAMPLES

Measurement of Electrical Conductivity

Electrical conductivity of polymers synthesized in the following examples are measured with commonly used four line probe method at room temperature in the condition of relative humidity of about 50%. Carbon paste was used for preventing the polymers from corroding in case of contacting gold wires. The electrical conductivity of film samples with thickness of about 1~100 μm (micron) (sample thickness: t, sample width: w) was measured by calculating voltages (V), currents (i), and distances (1) between 2 internal electrodes and 2 external electrodes connected to the samples with Keithley instruments.

$$\text{Electrical Conductivity} = (l \cdot i)/(w \cdot t \cdot v)$$

Electrical conductivity was calculated by the above equation (S/cm or Simen/cm). Electrical conductivity was also measured with Van der Pauw method, which uses standard four point probe, in order to certify the homogeneity in electrical conductivity of the samples. The 4 point measurement results were in the range within 5%.

SEM Particle Shape Measurement

Particle formation, structure of configuration of conductive polymers synthesized in the following examples were analyzed with scanning electron microscope (SEM, model no. XL-30, Philips Co.). SEM photographs particles within very restricted region, and therefore, we observed a lot of microscopy for obtaining representative images.

Measurement of Molecular Weight with GPC

Synthesized conductive polymers were analyzed with GPC (gel permeable chromatography) for measuring molecular weights thereof. The analysis was performed with GPC (Water 150 CV, column Shodex, AT-806MS (mixed column)) with NMP as solvent, 1 ml/min at 70° C., which is recommended in NMP solvent by the manufacturer. Standard sample was polystyrene with molecular weight of 1300, 3790, 9860, 30300, 65931, 172101, 629440, and 995598.

Example 1

Preparation of Highly Conductive Polyaniline (HCPANI)

In this example, highly conductive polyaniline (HCPANI) as emeraldine base (EB) form was prepared. 100 mL of distilled and purified aniline was added slowly dropwise into 6 L of 1M HCl and then 4 L of isopropyl alcohol was mixed with the solution. The mixed solution was maintained in the temperature of −15° C. Solution of 56 g of ammonium persulfate ((NH$_4$)$_2$S$_2$O$_8$), as an radical initiator, dissolved in 2 L of 1M HCl was added slowly dropwise into the above mixed solution for 40 minutes with stirring to initiate polymerization reaction. After 3 hours, the polymerization reaction was completed to form precipitate. The obtained precipitate was filtered with filter paper and washed with 1 L of 1M ammonium hydroxide (NH$_4$OH) solution. The precipitate was transferred into 5 L aqueous solution of 0.1 M ammonium hydroxide, stirred for 20 hours, washed with water, and then dried with vacuum pump for 48 hours to yield 1.5 g of polyaniline of emeraldine base (EB).

The synthesized polymer was analyzed with infrared spectroscopy and $^{13}$C-NMR technology. It was determined that the polyaniline synthesized in this example had a peak at about 1590 cm$^{-1}$ of wavelength, which is assigned to the ring stretching vibration of typical quinoid ring of polyaniline, a peak at about 1495 cm$^{-1}$ of wavelength, which is assigned to the ring stretching vibration of typical benzenoid ring of polyaniline, and a peak at about 3010 cm$^{-1}$ of wavelength, which is assigned to the ring stretching vibration of C—H of aromatic ring, in infrared spectroscopy spectrum (results are not shown).

Also, it was analyzed that polyaniline had peaks at about 137 ppm and about 141 ppm of chemical shifts in $^{13}$C NMR spectrum, which are typical peaks of polyaniline (result not shown). Especially, polyaniline synthesized in this example had higher peak intensity at about 137 ppm than peak intensity at about 141 ppm, which is resulted from ortho-coupling, in $^{13}$C NMR spectrum. Therefore, it was certified that polyaniline in this example was synthesized mainly by para-coupling, not ortho-coupling and has much less side chains compared to conventional polyaniline.

Example 2

The procedures and conditions were repeated as example 1, except that polymerization reaction was performed at about −25° C. Polymerization reaction were performed for 4~6 hours. It was certified that obtained material was polyaniline of emeraldine base form through infrared spectroscopy and NMR technology (results are not shown).

Examples 3

The procedures and conditions were repeated as example 1, except that ammonium persulfate as a radical initiator was added drop wise for 3 hours. Polymerization reaction were performed for 3~8 hours. It was certified that obtained material was polyaniline of emeraldine base form through infrared spectroscopy and NMR technology (results are not shown).

Example 4

The procedures and condition were repeated as example 3, except that ferric chloride as a radical initiator was added to the reaction system prior to changing color of reaction vessel from blue to green. Ferric chloride was added 0.1 molar equivalents to HCl 0.1 moles. Polymerization was performed for 3~6 hours. It was certified that obtained material was polyaniline of emeraldine base form through infrared spectroscopy and NMR technology (results are not shown).

Example 5

The procedures and conditions were repeated as example 1, except that chloroform instead of isopropyl alcohol as the organic solvent was used. The ratios of chloroform to hydrochloric acid solution dissolving aniline monomer were respectively 2:1 and 1:1 by volume, and polymerization reaction was performed for 3~6 hours. It was certified that each of obtained materials is polyaniline of EB form with infrared spectroscopy and NMR technology (results are not shown).

Example 6

The procedures and conditions were repeated as example 1, except that mixed solvent of chloroform and isopropyl alcohol (v/v=1:1) instead of isopropyl alcohol as the organic solvent was used. The ratios of mixed solvent to hydrochloric acid solution dissolving aniline monomer were respectively 2:1 and 1:1 by volume, and polymerization reaction was performed for 3~6 hours. It was certified that each of obtained materials is polyaniline of EB form with infrared spectroscopy and NMR technology (results are not shown).

Example 7

The procedures and conditions were repeated as example 2, except that mixed solvent of chloroform and 4-methyl-2-pentanone (v/v=1:1) instead of isopropyl alcohol as the organic solvent was used. The ratio of mixed solvent to hydrochloric acid solution dissolving aniline monomer was 2:1 by volume, and polymerization reaction was performed at for 6-10 hours. It was certified that each of obtained materials is polyaniline of EB form with infrared spectroscopy and NMR technology (results are not shown).

Example 8

Polyaniline substituted with alkyl group on the aromatic ring was synthesized in this example. Amine group of o-hydroxyl aniline was reacted with acetic anhydride to protect the amine group, and then protected aniline was reacted with hexane bromide in basic condition to substitute the aniline with alkyl group (hexyl group) on the aromatic ring. The protected amine group of obtained product was deprotected with hydrochloric acid to produce aniline derivative substituted with alkyl group on the aromatic ring.

5 g of the synthesized aniline derivative was added drop wise into 300 mL of 1M HCl solution, and the 200 mL of dichloro methane was mixed to the solution. The solution was maintained at −5° C., 100 mL of 1M HCl solution dissolving 1.2 g of ammonium persulfate was added drop wise to the mixed solution for 40 minutes with stirring. After 24 hours, obtained solution was separated to extract organic layer with separatory funnel. The extracted organic layer was transferred to 200 mL of 1M ammonium hydroxide (NH$_4$OH), stirred for 24 hours, filtered, and then dried for 24 hours with vacuum pump to yield 1.5 g of polyaniline of emeraldine base. It was certified that obtained material is polyaniline of EB form with infrared spectroscopy and NMR technology (results are not shown).

Example 9

The procedure was repeated as example 1, except carboxylic acid monomer represented by structure below, which is disclosed in example 5 of international patent publication No. WO 02-074833 as a soluble self-oriented material, was mixed to the reaction system in the ratio of 15% by weight to aniline monomer.

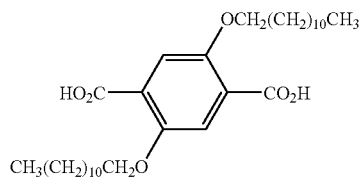

It was determined that the polymer by polymerization reaction has board-shaped particles, which was different form the polymer in example 2 not adding the soluble self-oriented material. It was certified that obtained polymer was polyaniline of emeraldine base form with infrared spectroscopy and NMR technology (results are not shown).

Comparative Example 1

Preparation of Polyaniline by Conventional Method

Polyaniline of emeraldine base (EB) was prepared according to conventional MacDiarmid method (MacDiarmid et al., Conducting Polymers Ed. By Alcacer, Dordrecht, 105, 1987).

Solution of 10 mL of distilled and purified aniline dissolved in 600 mL of 1M HCl was introduced into Erlenmeyer flask. Solution of 5.6 g of ammonium persulfate dissolved in 200 mL of 1M HCl was added slowly dropwise into the flask for 15 minutes with stirring to form polyaniline. After 2 hours, the polymerization reaction was completed to obtain precipitate. The obtained precipitate was filtered with filter paper and washed with 100 mL of ammonium hydroxide. The washed precipitate was transferred to 500 mL solution of 0.1 M ammonium hydroxide, stirred for 20 hours, filtered, and dried with vacuum pump for 48 hours to yield 1.5 g of polyaniline of emeraldine base. It was certified that the synthesized polymers were polyaniline as EB form with infrared spectroscopy and NMR analysis (results are not shown).

Comparative Examples 2~4

Preparation of Polyaniline

The procedures and conditions were repeated as comparative example 1, except that each of the polymerization reaction was performed respectively at −5° C. for 4 hours, −10° C. for 10 hours and at −15° C. for 17 hours with addition of 3M LiCl. It was certified that each of obtained materials is polyaniline of EB form with infrared spectroscopy and NMR technology (results are not shown).

Example 10

Measurement of Intrinsic Viscosity of Polyaniline

Highly conductive polyaniline (HCPANI) of emeraldine base form synthesized in examples 1 to 9 and conventional polyaniline (PANI) of emeraldine base from synthesized in comparative examples 1 to 4 were dedoped with ammonium hydroxide, dissolved in strong sulfuric acid of 0.1 g/dl. And then intrinsic viscosity (q) of HCPANI and PANI were determined at 30° C. Table 1 shows the results of intrinsic viscosity for HCPANI and PANI. It was certified that all the synthetic compounds were polymers from measuring the intrinsic viscosity.

TABLE 1

| EXAMPLE | Intrinsic Viscosity (dl/g) |
|---|---|
| 1 | 2.2 |
| 2 | 2.5 |
| 3 | 2.4 |
| 4 | 1.8 |
| 5 | 2.2-2.3 |
| 6 | 2.7 |
| 7 | 2.9 |
| 8 | 0.2 |
| 9 | 1.3 |
| Comparative Example 1 | 0.8 |
| Comparative Example 2 | 1.1 |
| Comparative Example 3 | 1.1 |
| Comparative Example 4 | 1.2 |

Example 11

Measurement of Optical Properties of Polyaniline

Solid powder polyaniline HCPANI of EB form (HCPANI) synthesized in example 1 and solid powder polyaniline of EB from (PANI) synthesized in comparative example 1 were analyzed with $^{13}$C CPMAS-NMR and PAS spectroscopy. $^{13}$C CPMAS-NMR spectrum was measured at 100.6 MHz and spinning rate 7 KHz in tetramethyl silane (TMS) as standard with Bruker NMR instrument. PAS spectrum was measured in helium with infrared spectrometer (Magna 550 PAS detector).

FIG. 2 shows a $^{13}$C CPMAS NMR analysis result of HCPANI synthesized in example 1. FIG. 3 shows a $^{13}$C CPMAS NMR analysis result of PANI synthesized in comparative example 1. FIG. 4 shows a PAS analysis result of HCPANI synthesized in example 1. FIG. 5 shows a PAS analysis result of PANI synthesized in comparative example 1.

As shown in FIG. 2, HCPANI synthesized according to example 1 has 2 remarkably distinguishable peaks at around 140 ppm of chemical shift, that is, at about 138 ppm and at about 143 ppm of chemical shift, in $^{13}$C CPMAS NMR spectrum, and especially a unique peat at about 138 ppm of chemical shift. Also, the peak intensity at about 138 ppm of chemical shift ($I_{138}$) is higher than the peak intensity at about 143 ppm of chemical shift ($I_{143}$). Besides, HCPANI has respectively a unique peak each at about 158 ppm and at about 127 ppm of chemical shift not multiple or composite peaks at such chemical shifts, which demonstrates structural superiority of HCPANI.

Besides, HCPANI had two relatively weak peaks at about 1107 cm$^{-1}$ in PAS spectrum as shown in FIG. 4, on the other hand conventional PANI had a relatively strong peak at about 1107 cm$^{-1}$ in PAS spectrum as shown in FIG. 5.

Example 12

Observation of Particle Formation

HCPANI powder of EB forms synthesized in above Examples 1 to 5 and PANI powder of EB from synthesized in comparative example 1 was analyzed with scanning electron microscopy in this example. FIGS. 6A, 6B, 6C, 6D, and 6E to 6F shows respectively a electron microscopy of particle structure of configuration for HCPANI powder of EB form synthesized in each of Example 1, Example 2, Example 3, Example 4, and Example 5.

As shown the figures, all of HCPANI particles synthesized according to the preferred example of the present invention show holes such as "foamed plastics", a hollow quadra-angular rod (or bar) shape like "honeycomb", or multiple layers such as "anion coat". In other words, it was analyzed that HCPANI particle of the present invention has steric configuration of much increased surface areas compared to the conventional PANI (FIGS. 7A and 7B). As shown in FIG. 6e, which is a electron microscopy enlarged by 30,000 for HCPANI particle synthesized in Example 5, particles of about 20~80 nm were assembled to form a kind of network configuration such as bunches of grapes. In other words, it was confirmed that HCPANI produced in the present invention was synthesized as nano-sized particles to form porous network configurations. Therefore, it is expected that the conductive polymers synthesized according to the present invention is synthesized as linear chains and thereby increasing their solubility in common organic solvents.

On the other hand, polyaniline synthesized according to the convention MacDiarmid method in comparative example 1 (PANI) has only compact structure, not network configuration, as shown in FIGS. 7A and 7B.

However, HCPANI powder of EB form synthesized in Example 1 had a mean area of 145 microns and a mean volume of 230 microns, while polyaniline powder of EB form synthesized in comparative example 1 had a mean area of 7 microns and a mean volume of 18 microns, in the particle analysis by light scattering.

Example 13

Measurement of Apparent Density

In this example, the apparent density of HCPANI powder of EB forms synthesized according to above examples 1 to 6 was measured. The apparent density of polyaniline was measured by calculating injection amount of each polymer from specified funnel by American Society for Testing and Materials (ASTM) D1895-96.

As described in above Example 12, HCPANI has characteristic particles and pores, which increases its surface area and thereby enhancing solubility to common solvents. Also, the apparent density, which means a mass per unit volume of particle, is one important physical property.

It was measured that HCPANI synthesized according to the present invention had apparent density of 0.0495-0.146 (g/cm$^3$), which is very low compared to conventional polyaniline.

Example 14

Measurement of Electrical Conductivity of Polyaniline as Pellet

In this example, electrical conductivity of HCPANI salts synthesized in examples 1 to 9 and PANI salts synthesized in comparative examples 1 to 4 as pellets were measured as described above. It was determined that HCPANI salts synthesized in Examples 1 to 4 has electrical conductivity of 16~38 S/cm, while PANI salts synthesized in comparative examples 1 to 4 has electrical conductivity of 2~5 S/cm.

Example 15

Measurement of Electrical Conductivity of Polyaniline in CSA Solution

In this example, both HCPANI salts synthesized in Examples 1 to 7 and PANI salts synthesized in comparative examples 1-4 were dedoped to obtain polyaniline of emeraldine base. 1.57 g of camphor sulfonic acid (CSA) was mixed with respective 1.23 g of polyaniline EB (molar equivalent of 1:2). The mixtures are dissolved in meta-cresol with concentration of 2% (w/w) and the solution was prepared by sonication for 2 hours. 0.5 mL of the solution was casted on slide glass and dried at 50° C. to manufacture film samples with a thickness of 0.5~80 μm. Electrical conductivity was performed on 3 film samples manufactured from each polyaniline as mentioned above. Table 2 shows mean electrical conductivity measured on each polyaniline film.

TABLE 2

| EXAMPLE | Electrical Conductivity(S/cm) |
|---|---|
| 1 | 690 |
| 2 | 810 |
| 3 | 760 |
| 4 | 660 |
| 5 | 860-920 |
| 6 | 1180 |
| 7 | 1350 |
| 8 | 10 |
| 9 | 510* |
|   | 480** |
| Comparative Example 1 | 210 |
| Comparative Example 2 | 170 |
| Comparative Example 3 | 250 |
| Comparative Example 4 | 190 |

*after polymerization reaction, soluble self oriented material is deleted.
**after polymerization reaction, soluble self oriented material is comprised.

Example 16

Measurement of UV-VIS-NIR Spectrum

Figure 8:
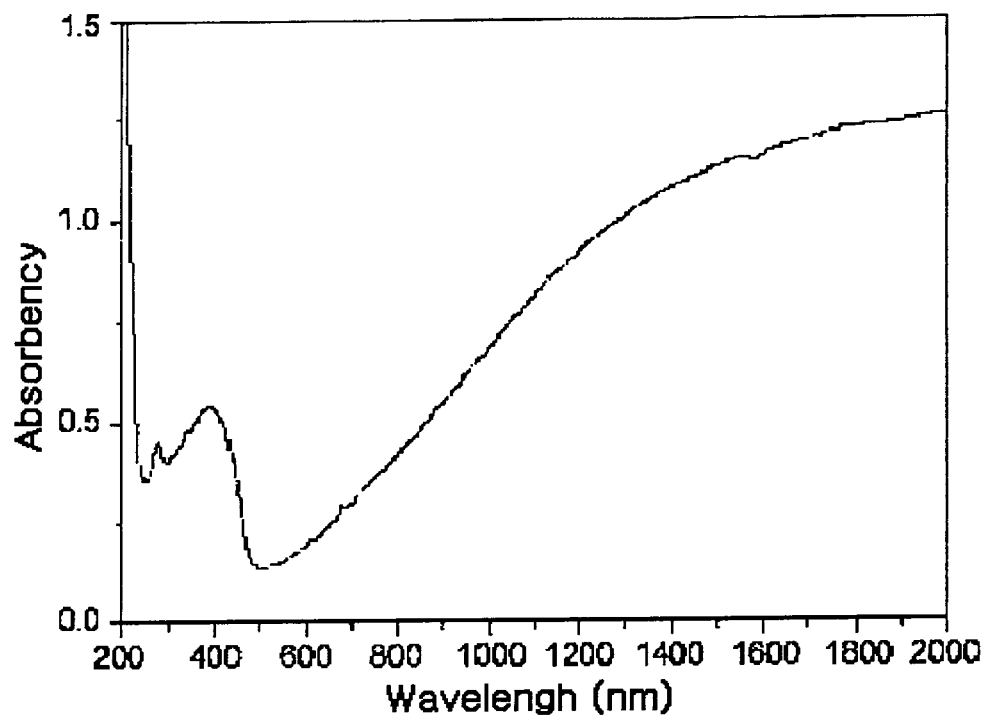
FIG. 8 shows a spectrum resulted from UV-VIS-NIR analysis for emeraldine base doped with camphor sulfonic acid (EB-CSA) synthesized according to the present invention.

Polyaniline of EB form synthesized in Example 2 was changed to polyaniline salt as Example 15, and then the salt was measured with UV-VIS-NIR spectrophotometer in this Example. FIG. 8 shows an analytical result of UV-VIS-NIR spectrophotometer for emeraldine base doped with camphor sulfonic acid (EB-CSA).

In UV-VIS-NIR spectrum for polyaniline of emeraldine salt, free carrier tail which contributes to enhancing electrical conductivity of the salt usually initiates at no less than 1000 nm. However, as shown in FIG. 8, it was observed that the emeraldine salt synthesized in Example 2 does not show a localized polaron band at around 1000 nm of wavelength, but shows a continued increased absorbency line. Especially, the emeraldine salt synthesized in Example 2 had a strong polaron band by comparing the peak intensity of meta-cresol at about 300 nm to the peak intensity at about 2000 nm by polaron band.

Such a result supports the reason structurally that the emeraldine base of Example 2 had high electrical conductivity as indicated in table 2 above. The strong absorbency at near infrared rays (about 2000 nm wavelength) is similar to the absorbency for metals. In other words, it is expected that polyaniline of emeraldine salt synthesized according to the preferred examples of the present SSDP process has "true metal" properties and therefore, may be used for EMI shield, unlike the conventional polyaniline emeraldine salt which has disordered properties.

Example 17

Measurement of Molecular Weight and Distribution Degree with GPC

Polyaniline with enhanced solubility was synthesized by substituting it with t-BOC in this Example according to the literature procedure (Lee et al, Macromolecules, 34, p4070, 2004). Polyaniline was prepared with the same procedures and condition as Example 1.

1.0 g ($5.5 \times 10^{-3}$ mole) of the synthesized emeraldine base and 4.8 g ($2.2 \times 10-2$ mole) of di-tert-butyloxocarbonyl (di-t-BOC) were dissolved in 30 mL of NMP. 20 mL of pyridine was added into the solution, and then the solution was stirred at 90° C. for 6 hours. The reaction product was precipitated with excessive water to filter, washed with solution of water and ethanol (1:1) to yield pure 0.6 g of t-BOC substituted polyaniline (HCPANI-tBOC). The obtained HCPANI-t-BOC was dissolved in tetrahydrofurane (THF), and then its molecular weight and molecular weight distribution are measured with gel permeation chromatography (GPC, Waters Co.)

It was determined that t-BOC substituted polyaniline had a number average molecular weight of 44,000 and a weight average molecular weight of 46,000. Besides, it wad analyzed that t-BOC substituted polyaniline had a molecular weight distribution degree of 1.1, which means t-BOC substituted polyaniline in this example had substantially mono-disperse distribution.

Example 18

NMR Analysis of Polyaniline

HCPANI synthesized according to Example 1 was analyzed by NMR in this Example. HCPANI salts of Example 1 was substituted with tert-butoxycarbonyl (t-BOC) to enhance solubility thereof for certifying its structures in solution state NMR analysis ($C^{13}$ NMR, Jeol YH400).

Introduction of t-BOC group into HCPANI was performed in accordance with literature (Lee et al., Macromolecules, 2004, 37, pp. 4070-4074). 4.0 g of each polyaniline powder and 13 mL of pyridine was added in 100 mL of N-methylpyrrolidinone (NMP), into which a solution comprising 9 g of di-tert-butyldicarbonate dissolved in 50 mL of NMP were added slowly at 80° C. The mixed solution was stirred in nitrogen reflux for 3 hours to obtain product. The product was washed with methanol and dried to yield pale dark reddish powders.

Such powders were dissolved in $CDCl_3$, which is solvent of NMR, to obtain $^{13}C$ NMR spectra. FIG. 9 shows an NMR analysis result of HCPANI substituted with t-BOC of the present invention. As shown the figures, it was determined that HCPANI-t-BOC had three peaks, which correspond to quaternary carbons, at about 140 ppm, about 148 ppm, and about 159 ppm of chemical shifts in solution state $^{13}$C NMR spectrum.

Example 19

Measurement of Molecular Weight and Distribution Degree with GPC 1.0 g (5.5×10$^{-3}$ mole) of the synthesized emeraldine base and 1.2 g of phenyl hydrazine were dissolved in 30 mL of NMP, and then reduced polyaniline was precipitated to 1 L of desiccated toluene. The precipitated polyaniline was washed 3 times with toluene to yield 0.5 g of yellowish brown leucoemeraldine base powder.

Figure 10:
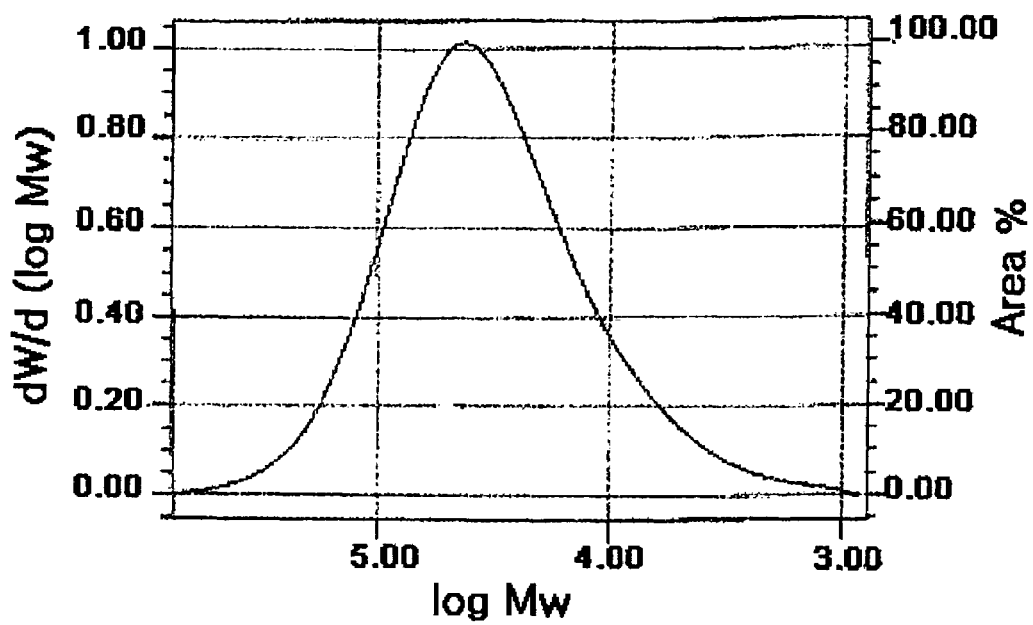
FIG. 10 is a graph showing the molecular-weight distribution of highly conductive polyaniline (HCPANI) synthesized according to the present invention.

The produced leucoemeraldine base was dissolved in NMP, and then its molecular weight and molecular weight distribution are measured with GPC (Waters Co.). Polyvinyl pyridine was used to determine molecular weight and distribution degree of polyaniline as a standard sample. It was determined that leucoemeraldine base had respectively a number average molecular weight of 45,000 and 37,000, weight average molecular weight of 112,000 and 87,000, and distribution degree of 2.5 and 2.4, according to the ratio of 2:1 and 1:1 of polymer to solvent. FIG. 10 shows a distribution of molecular weight of highly conductive polyaniline synthesized according to the present invention by GPC.

Angelopoulos et al. reported that synthesizing polyaniline by conventional MacDiarmid method resulted in high molecular weight polyaniline and low molecular weight polyaniline and thereby showing various peaks. Especially, high molecular weight polyaniline comprises nothing but 4~10% among produced polymers, and synthesized polymers had broad degree of dispersion of about 3.7 to 6.6 (Angelopulos et al., Synth. Met. 84, p 35, 1997). On the other hand, the high molecular-weight polymer according to this example shows a unique peak, not separated peaks, and lower molecular distribution degree as shown in FIG. 9.

Example 20

Preparation Polypyrrole

A solution comprising 33.5 g (0.5 mol) of distilled and purified pyrrole dissolved in 1.0 L of 1M HCl was added drop wise to 500 mL of chloroform, and then the solution was maintained in the temperature of −5° C. Solution of 0.1 mol of ammonium persulfate (($NH_4$)$_2$$S_2$$O_8$), as an radical initiator, dissolved in 100 mL of 1M HCl was added slowly into the above mixed solution for 10 minutes with stirring intensively to initiate polymerization reaction. After 40 hours, the polymerization reaction was completed. The mixed solution was poured into methanol solution, and washed with distilled water several times. Residual precipitate was filtered, and then dried in vacuum oven for 24 hours. Obtained precipitate was transferred into 1 L of 1M ammonium hydroxide, stirred 20 hours, washed with water, and then dried with vacuum pump for 48 hours to yield 11 g of polypyrrole.

It was determined that polypyrrole in this example had inherent viscosity of 0.3 (in MMP) and that polypyrrole particle doped with HCl had electrical conductivity of 45 S/cm.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A process of synthesizing a conductive polymer, the process comprising:
   (a) mixing a monomer substituted with an amine group and an organic solvent with an acid solution comprising an acid dissolved in a hydrophilic solvent, wherein the organic solvent is substantially immiscible with the hydrophilic solvent and the monomer is mixed with the acid solution prior to the organic solvent; and
   (b) adding a radical initiator dissolved in a protonic acid into the acid solution to synthesize the conductive polymer in a heterogeneous biphasic system of an aqueous phase and an organic solution phase dispersed in the aqueous phase, wherein the conductive polymer is synthesized in a self-stabilized mode without any stabilizers or anti-freezing agents, wherein the conductive polymer is synthesized in the temperature of less than or equal to −5° C. wherein the conductive polymer has an electrical conductivity of at least about 300 S/cm.

2. The process according to claim 1, wherein the monomer substituted with the amine group has a structure represented by formula I below:

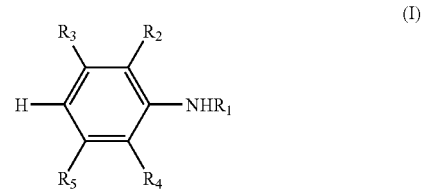

(c) wherein $R_1$ is hydrogen, alkyl, or alkoxy group; and each $R_2$ to $R_5$ is respectively hydrogen, alkyl, alkenyl, cycloalkyl, cycloalkenyl, alkyl-thioalkyl, alkanoyl, thioalkyl, aryl-alkyl, alkyl-amino, amino, alkoxy carbonyl, alkyl sulfonyl, alkyl sulfinyl, thioaryl, sulfonyl, carboxyl, hydroxyl, halogen, nitro, or alkyl-aryl.

3. The process according to claim 1, wherein the monomer substituted with the amino group has a structure represented by formula II below:

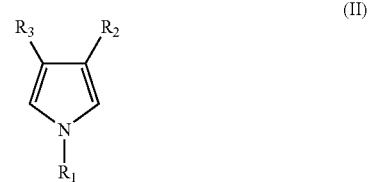

wherein $R_1$ is hydrogen, alkyl, or alkoxy group; and each $R_2$ and $R_3$ is respectively hydrogen, alkyl, alkenyl, cycloalkyl, cycloalkenyl, alkyl-thioalkyl, alkanoyl, thioalkyl, aryl-alkyl, alkyl-amino, alkoxy carbonyl, alkyl sulfonyl, alkyl sulfinyl, thioaryl, sulfonyl, carboxyl, hydroxyl, halogen, nitro, or alkyl-aryl.

4. The process according to claim 1, wherein the acid comprises an inorganic acid.

5. The process according to claim 1, wherein the acid is selected from the group consisting of hydrochloric acid, sulfuric acid, nitric acid, or phosphoric acid.

6. The process according to claim 1 wherein the protonic acid comprises an inorganic acid.

7. The process according to claim 6, wherein the inorganic acid is selected from the group consisting of hydrochloric acid, nitric acid, sulfuric acid, phosphoric acid, hydrofluoric acid, or hydroiodic acid or mixtures thereof.

8. The process according to claim 1, wherein the protonic acid comprises an organic acid.

9. The process according to claim 8, wherein the organic acid is selected from the group consisting of methyl sulfonic acid, dodecyl benzene sulfonic acid, antraquinone-2-sulfonic acid, 4-sulfosalicylic acid, camphor sulfonic acid, chlorinated sulfonic acid, and trifluoro-sulfonic acid.

10. The process according to claim 1, wherein the organic solvent has a solubility parameter of about 17 to about 29.

11. The process according to claim 1, wherein the organic solvent comprises hydrocarbons unsubstituted or substituted with hydroxyl, halogen, oxygen, ketone, or carboxyl group.

12. The process according to claim 1, wherein the organic solvent is an alkyl halide.

13. The process according to claim 1, wherein the organic solvent comprises dichloromethane, pentachloro ethane, 1,1,2,2-tetrachloro ethane, trichloro ethane, trichloro ethylene, chloroform, ethyl bromide, ethyl chloride, dichloro propane, trichloro ethane, bis(2-chloroethyl)ether, dichloro ethyl ether, 1,2-dichloro benzene, or mixtures thereof.

14. The process according to claim 1, wherein the organic solvent is selected from the group consisting of 1-propanol, 2-methyl-2-propanol, 1,2-dipropandiol, 1,3-propandiol, isopropyl alcohol, butanol, neopentanol, 2-methoxy ethanol, 2-butoxy ethanol, 2-ethyl-1-butanol, 3-methyl-1-butanol, 2-methyl-2-butanol, 3-methyl-2-butanol, 1-pentanol, 2-pentanol, 3-pentanol, 1,2-propanediol, 1,5-pentandiol, amyl alcohol, 2-methyl-1-pentanol, 3-methyl-1-pentanol, 2-methyl-2-pentanol, 3-methyl-2-pentanol, 4-methyl-2-pentanol, 2-methyl-3-pentanol, 3-methyl-3-pentanol, hexanol, ethyl hexanol, heptanol, 3-heptanol, 2-methyl-2,4-pentandiol, 2-ethyl-1,3-hexandiol, octanol, 1-octanol, 2-octanol, decanol, dodecanol, cyclohexanol, tri-ethylene glycol, di-ethylene glycol, tetra-ethylene glycol, tetra-hydrofurfuryl alcohol, and mixtures thereof.

15. The process according to claim 1, wherein the organic solvent comprises ethylene glycol monoethyl ether, ethylene glycol dimethyl ether, ethylene glycol monomethyl ether, ethylene glycol monobutyl ether, diethylene glycol monoethyl ether, diethylene glycol monobutyl ether, diethylene glycol diethyl ether, diethylene glycol dimethyl ether, diethylene glycol monomethyl ether, 1,4-dioxane, or mixtures thereof.

16. The process according to claim 1, wherein the organic solvent comprises butyl methyl ketone, methyl-ethyl ketone, 4-hydroxy-4-methyl-2-pentanone, cyclopentanone, diacetone alcohol, 4-methyl-pentanone, 4-methyl-2-pentanone, or mixtures thereof.

17. The process according to claim 1, wherein the organic solvent comprises diethyl carbonate, benzyl acetate, dimethyl glutarate, ethylacetoacetate, isobutyl isobutanoate, isobutyl acetate, meta-cresol, toluene, xylene, nitrobenzene, tetrahydrofuran, N-methyl-2-pyrolidone, dimethyl sulfoxide, N,N-dimethylformamide, or mixtures thereof.

18. The process according to claim 1, wherein the radical initiator comprises ammonium persulfate, hydrogen peroxide, manganese dioxide, potassium dichromate, potassium iodate, ferric chloride, potassium permanganate, potassium bromate, potassium chlorate, or mixtures thereof.

19. The process according to claim 1, wherein step (b) is performed in the temperature of between about −45° C. to about −5° C.

20. The process according to claim 1, wherein the radical initiator and the organic solvent comprises an organic phase, wherein the organic phase comprises about 5-95% by weight based upon total aqueous solution.

21. The process according to claim 1, wherein the hydrophilic solvent comprises water, methanol, acetonitrile, 2-methoxy ethanol, or mixtures thereof.

22. The process according to claim 1, wherein the hydrophilic solvent is water.

* * * * *